US008218620B2

(12) United States Patent
Isobe et al.

(10) Patent No.: US 8,218,620 B2
(45) Date of Patent: Jul. 10, 2012

(54) PICTURE PROCESSING APPARATUS, INDEX CREATING APPARATUS, IMAGING APPARATUS, INDEX CREATING METHOD, AND PROGRAM

(75) Inventors: Yukio Isobe, Kanagawa (JP); Atsushi Mae, Kanagawa (JP); Kenichiro Nagao, Tokyo (JP); Tooru Masuda, Tokyo (JP)

(73) Assignee: Sony Corporation, Tokyo (JP)

( * ) Notice: Subject to any disclaimer, the term of this patent is extended or adjusted under 35 U.S.C. 154(b) by 880 days.

(21) Appl. No.: 12/292,910

(22) Filed: Dec. 1, 2008

(65) Prior Publication Data

US 2009/0172032 A1    Jul. 2, 2009

(30) Foreign Application Priority Data

Dec. 28, 2007   (JP) .................................. 2007-341028

(51) Int. Cl.
*H04N 11/02* (2006.01)
(52) U.S. Cl. ............................. 375/240.01; 375/240.13
(58) Field of Classification Search ................. 375/240, 375/240.01, 240.16, 240.13
See application file for complete search history.

(56) References Cited

U.S. PATENT DOCUMENTS 6,396,874 B1 *   5/2002   Kato ........................ 375/240.16
7,095,783 B1 *   8/2006   Sotheran et al. ......... 375/240.01

FOREIGN PATENT DOCUMENTS

| JP | 11-289517 | 10/1999 |
| JP | 2003-204541 A | 7/2003 |
| JP | 2007-226606 A | 9/2007 |
| JP | 2007-280325 A | 10/2007 |

OTHER PUBLICATIONS

Japanese Office Action issued Oct. 20, 2009 for corresponding Japanese Application No. 2007-341028.

* cited by examiner

*Primary Examiner* — Hosuk Song
(74) *Attorney, Agent, or Firm* — Rader Fishman & Grauer, PLLC

(57) ABSTRACT

Disclosed herein is a picture processing apparatus including: an attribute information detection section configured to detect attribute information about a plurality of pictures included in moving picture data; an index data creation section configured to create index data for indexing the attribute information to the positions in the moving picture data of those of the plurality of pictures which correspond to the attribute information; and a stream data creation section configured to create stream data including the moving picture data and the index data.

15 Claims, 20 Drawing Sheets

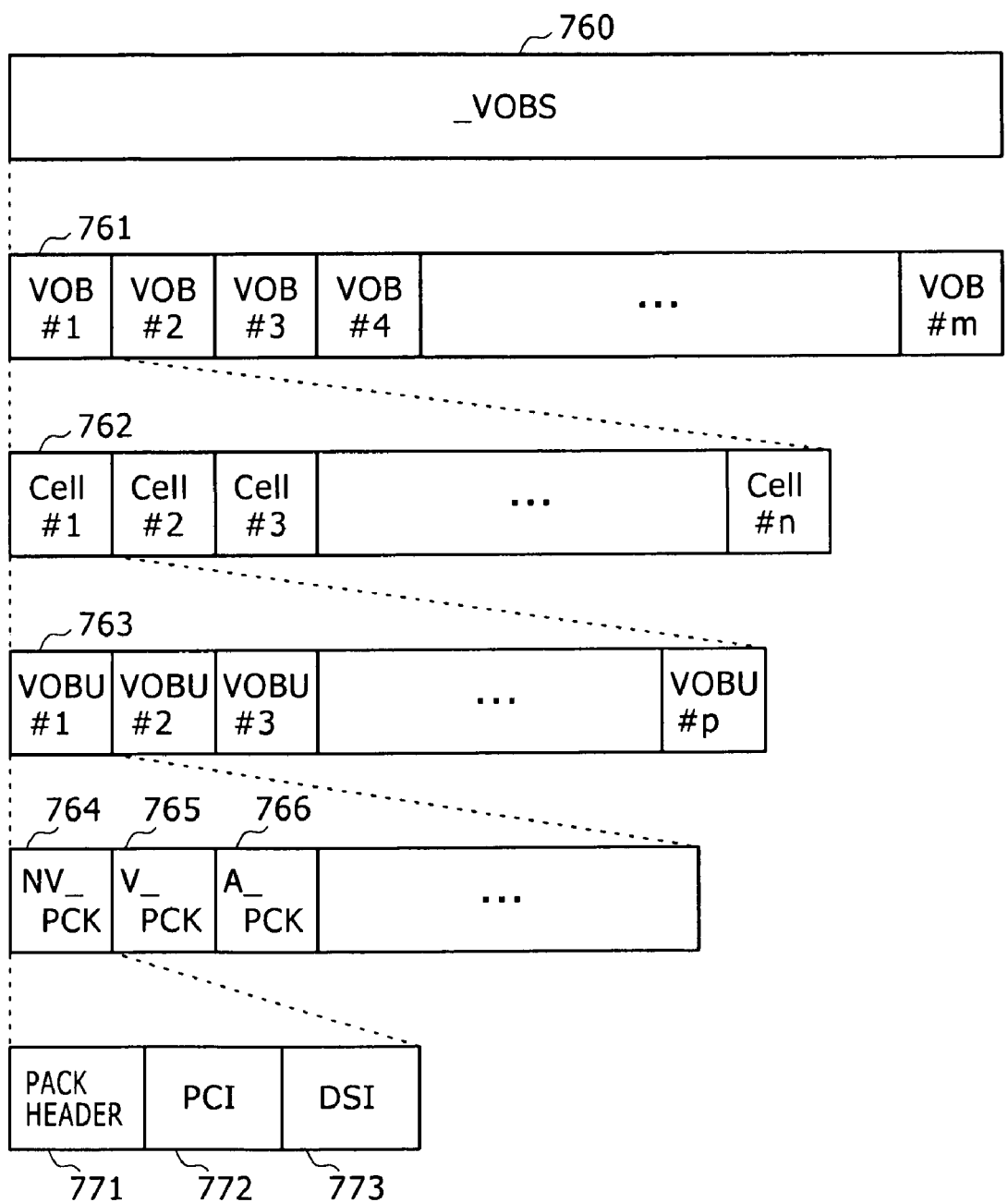

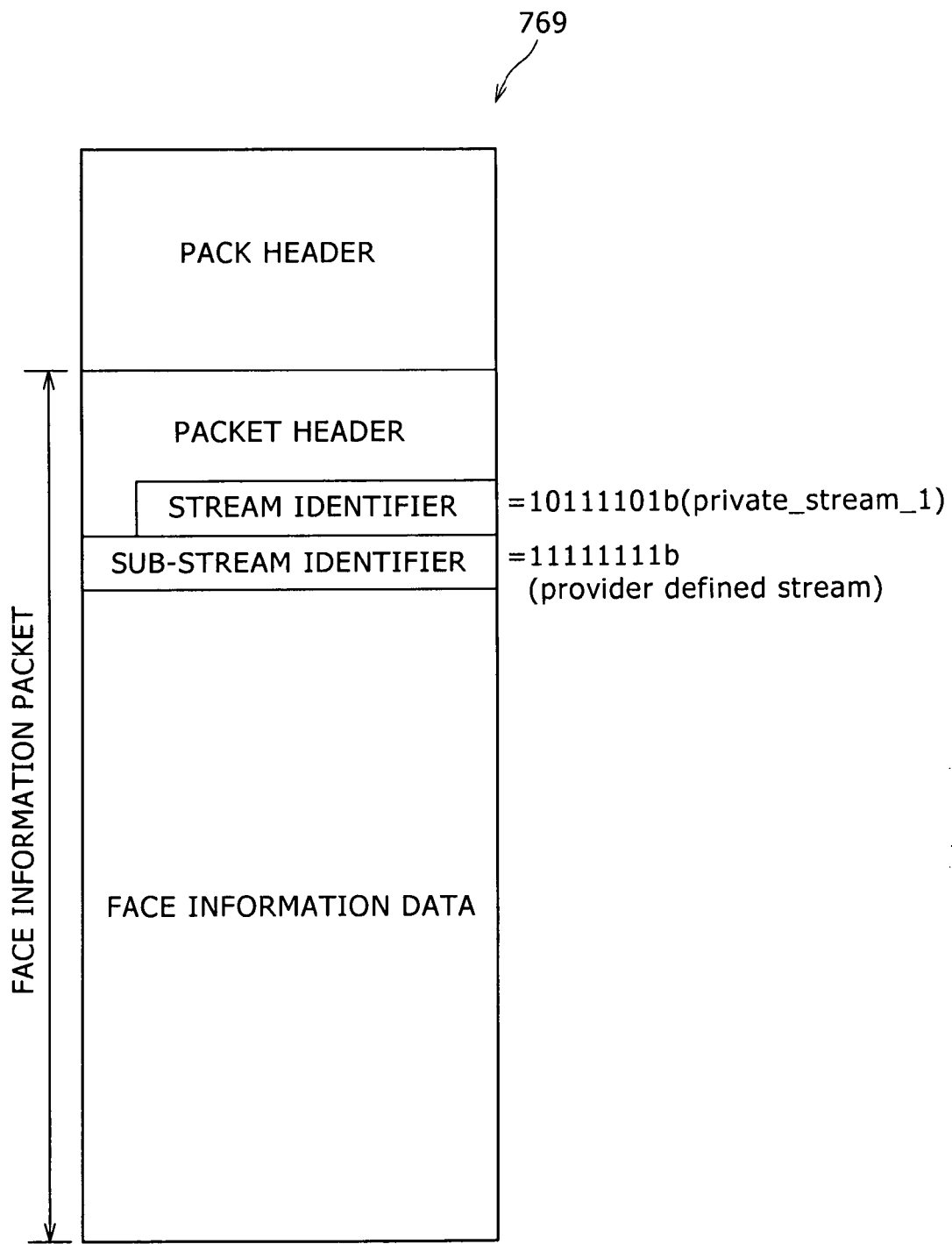

FIG. 8

| CAO_ID | | | | FACE INFORMATION IDENTIFIER |
|---|---|---|---|---|
| | CAO_DAT_ID | | | FACE INFORMATION DATA IDENTIFIER |
| | CAO_DAT_VER | | | FACE INFORMATION VERSION |
| CAO_FACE_INFO | | | | FACE INFORMATION PROPERTIES |
| | CAO_FINFO_SIZE | | | FACE INFORMATION SIZE |
| | FACE_DAT_VER | | | FACE INFORMATION DATA VERSION |
| | FBLK_STRUCT_FLG | | | FACE BLOCK INFORMATION FLAG |
| | FBLK_TIMESCALE | | | TIME SCALE |
| | FBLK_Ns | | | FACE BLOCK INFORMATION DATA COUNT |
| | FDETECT_INF_SIZE | | | FACE DETECTION INFORMATION SIZE |
| | FBLK_SIZE | | | FACE BLOCK INFORMATION DATA SIZE |
| for(i=0;i<FBLK_Ns;I++) | | | | FACE INFORMATION |
| | FACE_DETECT_INFO | | | FACE DETECTION INFORMATION |
| | | CELL_ID | | FACE DETECTION CELL NUMBER |
| | | OFFSET | | FACE DETECTION POSITION |
| | FACE_BLOCK | | | FACE BLOCK INFORMATION |
| | | FACE_DETECT_TIME_OFFSET | | FACE DETECTION TIME OFFSET |
| | | FACE_BASIC_INFO | | FACE BASIC INFORMATION |
| | | | X | X COORDINATE |
| | | | Y | Y COORDINATE |
| | | | WIDTH | WIDTH |
| | | | HEIGHT | HEIGHT |
| | | FACE_SCORE | | FACE SCORE INFORMATION |
| | | FACE_EXPRESSION_INFO_1 | | FACE EXPRESSION INFORMATION |

PICTURE PROCESSING APPARATUS, INDEX CREATING APPARATUS, IMAGING APPARATUS, INDEX CREATING METHOD, AND PROGRAM

CROSS REFERENCES TO RELATED APPLICATIONS

The present invention contains subject matter related to Japanese Patent Application JP 2007-341028 filed with the Japan Patent Office on Dec. 28, 2007, the entire contents of which being incorporated herein by reference.

BACKGROUND OF THE INVENTION

1. Field of the Invention

The present invention relates to a picture processing apparatus. More particularly, the invention relates to a picture processing apparatus, an index creating apparatus, an imaging apparatus, and an index creating method whereby attribute information is detected about a plurality of pictures included in moving picture data or whereby index display screens are created based on such attribute information; as well as to a program for causing a computer to execute the index creating method.

2. Description of the Related Art

Recent years have witnessed the widespread use of digital video cameras for recording moving pictures. In the digital video camera, acquired moving picture data is encoded before being recorded to a suitable recording medium such as a DVD (digital versatile disk), a hard disk or a flash memory. From the recording medium, the recorded moving picture data is reproduced and displayed by the digital video camera or by some other reproducing apparatus.

Where moving picture data is to be reproduced for display, the user may wish to have the data reproduced not in its entirety from the beginning but in part starting from a particular scene halfway through the data. In such cases, it often takes time and considerable effort to search the whole moving picture data for that particular scene.

Techniques to bypass the above-mentioned bottleneck have been proposed whereby thumbnails are created from different parts of the moving picture data to be reproduced. The thumbnails thus created provide indexes to specific recording positions from which to start reproducing the moving picture data in question. One such proposed technique is in the form of a reproducing apparatus (see Japanese Patent Laid-Open No. Hei 11-289517, FIG. 7) which creates a plurality of thumbnails representative of a plurality of scenes in the moving picture data stored on a recording medium. The proposed reproducing apparatus allows the user to select a desired thumbnail, and the moving picture will be reproduced starting from the scene corresponding to the selected thumbnail.

SUMMARY OF THE INVENTION

The above-outlined kind of techniques makes it possible to reproduce moving picture data starting from a specific scene represented by one of the thumbnails denoting different scenes throughout the data. The information about these scenes is stored preferably as a management information file or the like. Such independent files, however, are likely to be lost when different apparatuses transfer the corresponding moving picture data therebetween.

The present invention has been made in view of the above circumstances and provides arrangements whereby the information about the scenes included in moving picture data is retained even after the data has been transferred.

In carrying out the present invention and according to one embodiment thereof, there is provided a picture processing apparatus, as well as a method and a program for implementing the picture processing apparatus, which includes: attribute information detection means for detecting attribute information about a plurality of pictures included in moving picture data; index data creation means for creating index data for indexing the attribute information to the positions in the moving picture data of those of the plurality of pictures which correspond to the attribute information; and stream data creation means for creating stream data including the moving picture data and the index data. The major effect of this structure is its capability to store into the stream data the index data for indexing the attribute information to those positions in the moving picture data which correspond to the attribute information.

Preferably, the attribute information may be constituted by feature quantities of the pictures corresponding to the attribute information. The attribute information detection means may detect the number of face pictures included in the plurality of pictures as the feature quantities. The stream data creation means may create the stream data in video object units and the index data may be stored in the last video object unit.

According to another embodiment of the present invention, there is provided an imaging apparatus, as well as a method and a program for implementing the imaging apparatus, which includes: imaging means for creating moving picture data by imaging objects; attribute information detection means for detecting attribute information about a plurality of pictures included in the moving picture data; index data creation means for creating index data for indexing the attribute information to the positions in the moving picture data of those of the plurality of pictures which correspond to the attribute information; and stream data creation means for creating stream data including the moving picture data and the index data. The major effect of this structure is its capability to store into the stream data the index data for indexing the attribute information to the positions corresponding to the attribute information in the moving picture data acquired through imaging.

According to a further embodiment of the present invention, there is provided an index creating apparatus for creating an index display screen from stream data which holds both moving picture data and index data for indexing the positions in the moving picture data of a plurality of pictures to attribute information about the plurality of pictures, as well as a method and a program for implementing the index creating apparatus, which includes: attribute information analysis means for analyzing the attribute information so as to identify the pictures suitable for index display; position creation means for creating the positions of the identified pictures in the moving picture data; representative picture creation means for creating a representative picture of the moving picture data based on the created positions; and index display screen creation means for creating the index display screen based on the representative picture. The major effect of this structure is its capability to create the index display screen on the basis of the pictures identified by the index data included in the stream data.

Preferably, with regard to the structure above, the attribute information may be constituted by feature quantities of the pictures corresponding to the attribute information. The feature quantities may denote the number of face pictures included in the plurality of pictures; and the attribute information analysis means may detect from the plurality of pictures those pictures in which the number of face pictures varies and may identify the detected pictures as the pictures suitable for index display. The major effect of these preferred structures is the capability to create the index display screen in a manner divided at the positions where the number of face pictures varies.

According to an even further embodiment of the present invention, there is provided an imaging apparatus, as well as a method and a program for implementing the imaging apparatus, which includes: imaging means for creating moving picture data by imaging objects; attribute information detection means for detecting attribute information about a plurality of pictures included in the moving picture data; index data creation means for creating index data for indexing the attribute information to the positions in the moving picture data of those of the plurality of pictures which correspond to the attribute information; stream data creation means for creating stream data including the moving picture data and the index data; attribute information analysis means for analyzing the attribute information included in the stream data so as to identify the pictures suitable for index display; position creation means for creating the positions of the identified pictures in the moving picture data; representative picture creation means for creating a representative picture of the moving picture data based on the created positions; and index display screen creation means for creating an index display screen based on the representative picture. The major effect of this structure is its capability to store into the stream data the index data for indexing the attribute information to the positions of those of the plurality of pictures corresponding to the attribute information in the moving picture data acquired through imaging, so that the index display screen may be created on the basis of the pictures identified by the index data.

One embodiment to be claimed may include attribute information detection means corresponding to a face detection portion 114, index data creation means corresponding to a face information creation portion 115, and stream data creation means corresponding to a recording control portion 113.

Another embodiment to be claimed may illustratively include imaging means corresponding to an imaging portion 112, attribute information detection means corresponding to the face detection portion 114, index data creation means corresponding to the face information creation portion 115, and stream data creation means corresponding to the recording control portion 113.

A further embodiment to be claimed may illustratively include attribute information analysis means corresponding to a face information analysis portion 122, position creation means corresponding to an address creation portion 123, representative picture creation means corresponding to a face thumbnail creation portion 124, and index display screen creation means corresponding to a face index creation portion 125.

An even further embodiment to be claimed may illustratively include imaging means corresponding to the imaging portion 112, attribute information detection means corresponding to the face detection portion 114, index data creation means corresponding to the face information creation portion 115, stream data creation means corresponding to the recording control portion 113, attribute information analysis means corresponding to the face information analysis portion 122, position creation means corresponding to the address creation portion 123, representative picture creation means corresponding to the face thumbnail creation portion 124, and index display screen creation means corresponding to the face index creation portion 125.

According to the present invention outlined above, it is possible to retain the information about the scenes in moving picture data even after the transfer of the moving picture data.

BRIEF DESCRIPTION OF THE DRAWINGS

Further features and advantages of the present invention will become apparent upon a reading of the following description and appended drawings in which:

FIG. 3 is a schematic view showing components making up a video object set (VOBS);

FIG. 7 is a schematic view showing a typical internal structure of a face information pack according to an embodiment of the present invention;

FIG. 8 is a tabular view listing a typical structure of face information data according to the embodiment of the invention;

DETAILED DESCRIPTION OF THE PREFERRED EMBODIMENTS

The preferred embodiments of the present invention will now be described in detail with reference to the accompanying drawings. Although the embodiments will be discussed illustratively in conjunction with the disk complying with the DVD-Video standard, this is not limitative of the present invention. The invention applies in like manner to other types of recording media as well.

Figure 1:
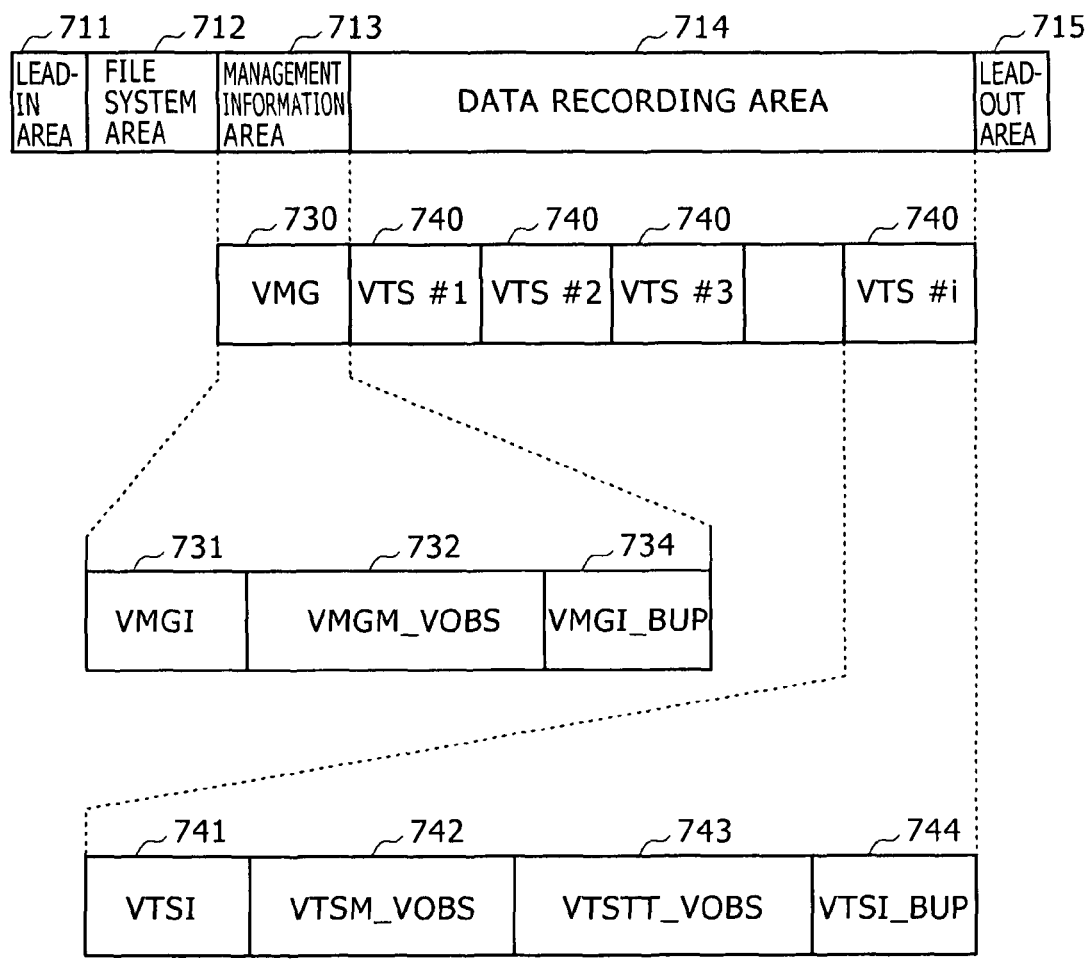
FIG. 1 is a schematic view showing a typical data structure on a disk complying with the DVD-Video standard.

FIG. 1 schematically shows a typical data structure on the disk complying with the DVD-Video standard. The disk, shaped like a circular plate, has on its surface a lead-in area 711 on the radially innermost side and a lead-out area 715 on the radially outermost side. A file system area 712, a management information area 713, and a data recording area 714 are arranged, in that order, from the radially inner side to the radially outer side. The file system area 712 is managed by a file system in compliance with ISO 9660 and the UDF (Universal Disk Format) standard. The management information area 713 is an area that holds management information about the entire video contents recorded on the disk. The data recording area 714 retains the contents of individual video title sets and their control information. These areas are divided into logical sectors of 2,048 bytes each.

The management information area 713 holds VMG (Video ManaGer) 730 that includes VMGI (VMG Information) 731, VMGM_VOBS (Video OBject Set for VMG Menu) 732, and VMGI_BUP (VMGI for Back UP) 734. As will be discussed later, VMGI 731 holds title-by-title management information about the video contents recorded on the disk as well as top menu control information. VMGM_VOBS 732 holds top menu data. VMGI_BUP 734 is a backup copy of VMGI 731.

The data recording area 714 holds at least one VTS (Video Titles Set) 740. Each VTS 740 includes VTSI (VTS Information) 741, VTSM_VOBS (Video OBject Set for VTS Menu) 742, VTSTT_VOBS (Video OBject Set for Titles in a VTS) 743, and VTSI_BUP (VTSI for Back UP) 744. As will be explained later, the VTSI 741 holds chapter-by-chapter management information and control information about the titles included in the video title set in question, as well as chapter menu control information. The VTSM_VOBS 742 holds chapter menu data. The VTSTT_VOBS 743 holds the data of the titles included in the video title set in question. The VTSI_BUP 744 is a backup copy of VTSI 741.

Figure 2:
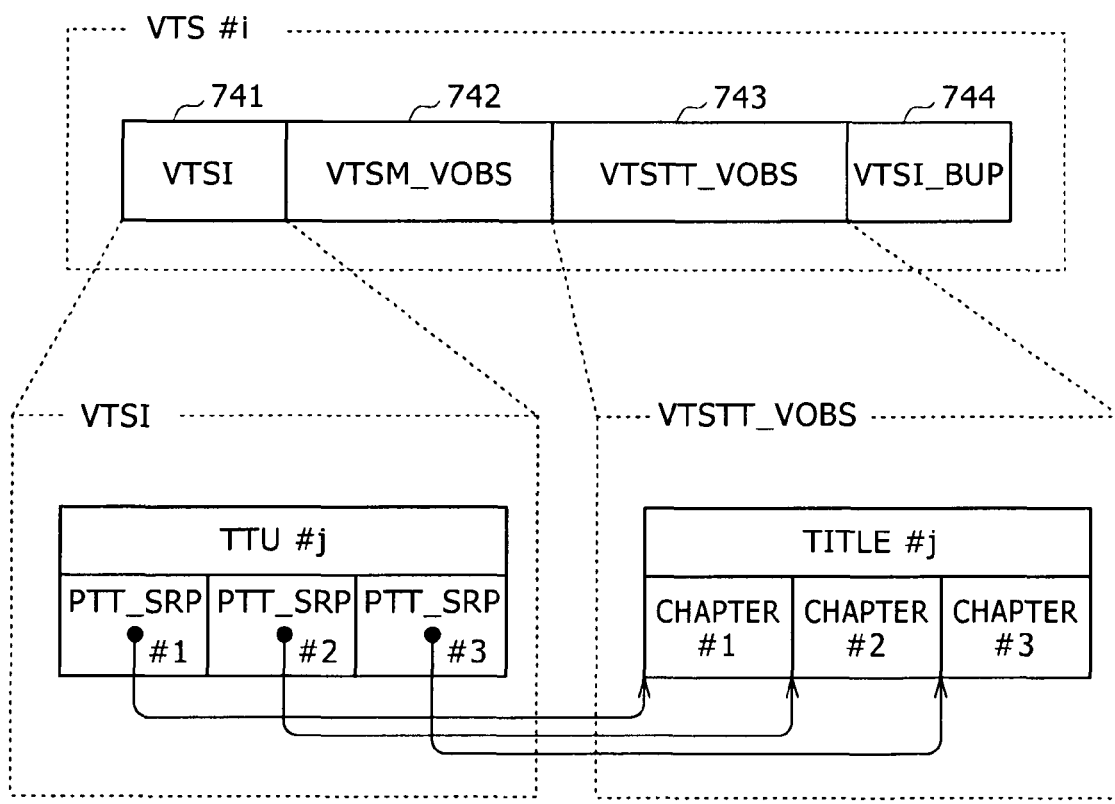
FIG. 2 is a schematic view showing the relations between titles and chapters in a video title set (VTS)

FIG. 2 schematically shows the relations between titles and chapters in a video title set (VTS). As mentioned above, the real data of the video contents is recorded in the VTSTT_VOBS 743. Each VTS 740 may store up to 99 titles. However, this maximum title count is subject to the usage status of other VTS's because the entire disk can only accommodate up to 99 titles.

Each of the titles in a VTS 740 includes at least one chapter. Each title may retain up to 99 chapters. In the case of the camcorder, a single session of recording from beginning to end is recorded as a single chapter. Illustratively, chapters are created cumulatively under the same title until the disk is ejected, until 99 chapters have been created under the title, until 99 cells have been generated under the title, or until moving picture mode is replaced by still picture mode. When the 99th chapter is completed under the current title, that title is closed; the next chapter will then be created under a new title.

The VTSI 741 serves to specify the starting position of a chapter under each title. As will be described later, the VTSI 741 holds pointers (PTT_SRP) pointing to the starting position of each chapter as title-by-title management information (TTU).

FIG. 3 schematically shows components making up a video object set (VOBS) 760. The VMGM_VOBS 732, VTSM_VOBS 742, and VTSTT_VOBS 743 shown in FIG. 1 retain their data as video object sets (VOBS), and share a common format. The VOBS 760 is a set of at least one video object (VOB) 761. The VOB's 761 are each assigned a VOB_ID number for identification purposes. Each VOB 761 is made up of at least one cell 762. The cells 762 constitute units in which real-time reproduction is carried out. Like the VOB's 761, the cells 762 are each assigned a cell ID number for identification.

Each cell 762 includes at least one video object unit (VOBU) 763. Each VOBU 763 is a series of packs headed by a navigation pack (NV_PCK) 764. The packs are each made up of 2,048-byte fixed data. The navigation pack NV_PCK 764 positioned at the beginning is followed by a video pack (V_PCK) 765 that holds video data and an audio pack (A_PCK) 766 that retains audio data.

The NV_PCK 764 holds a pack header 771 followed by presentation control information (PCI) 772 and data search information (DSI) 773. The PCI 772 constitutes control information about the presentation of what is reproduced, including angle information for non-seamless reproduction and information for sub-picture highlight display. The DSI 773 makes up control information for access to the disk, including angle information for seamless reproduction and information for VOBU search in increments of a reproduction time period (0.5 seconds×n).

Figure 4A:
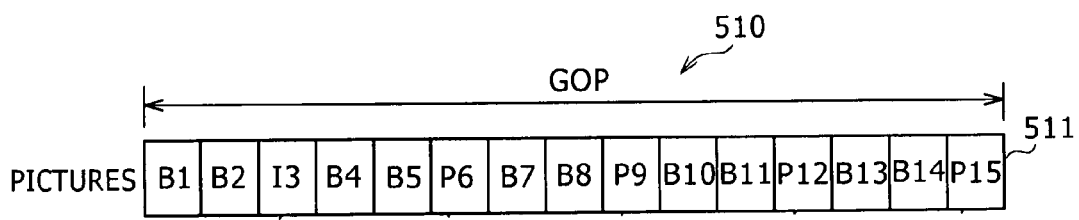
FIGS. 4A, 4B and 4C are schematic views showing the relations between a video object unit (VOBU) and encoded pictures.
Figure 4B:
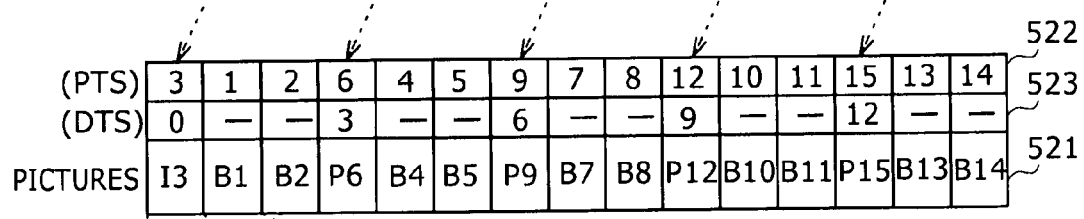
Figure 4C:
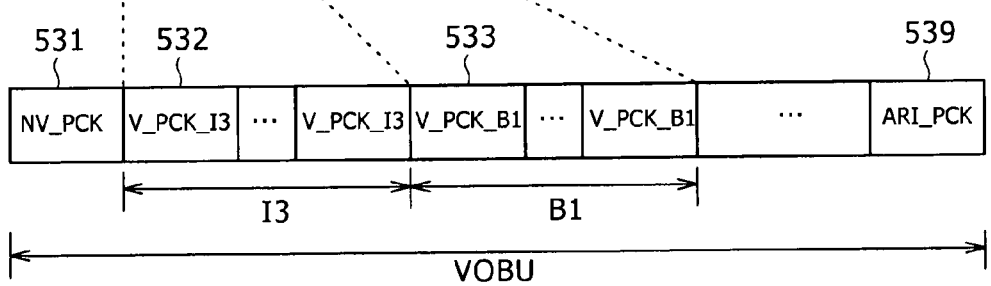

FIGS. 4A, 4B and 4C are schematic views showing the relations between a video object unit (VOBU) and encoded pictures. The picture data in the VOBS 760 is encoded using program streams (PS) in compliance with the MPEG-2 (Moving Picture Experts Group-2) standard. According to the MPEG-2 standard, 15 pictures called GOP (group of pictures) make up a moving picture lasting about 0.5 seconds. In FIG. 4A, one I-picture, four P-pictures, and 10 B-pictures make up 15 pictures 511 that constitute a GOP 510. The I-picture is an intra-frame encoded picture that is a closed picture encoded independently of other P- and B-pictures. The P-pictures are each encoded using a differential with regard to the temporally preceding I-picture or P-picture. The B-pictures are each encoded using differentials relative to the temporally preceding and immediately following I-pictures or P-pictures. That means only the I-pictures can be decoded independently in each GOP.

On the disk, the 15 pictures in each GOP are recorded with their sequence partially changed as shown in FIG. 4B. The changes in the picture sequence are dictated by the above-mentioned encoding method and are meant to avoid having to wait for temporally subsequent pictures to come up during decoding. For example, to decode a B-picture (B5) requires referencing an I-picture (I3) and a P-picture (P6). With the changes such as those of FIG. 4B in place, the necessary image data (I3 and P6) is ready when the B-picture (B5) is to be decoded. Such a picture-to-picture sequence 521 is maintained using two timestamps: PTS (Presentation Time Stamp) 522 and DTS (Decoding Time Stamp) 523. The PTS 522 is time management information for reproduction output, indicating when to output the timestamped unit pictures for reproduction. The DTS 523 is time management information for decoding purposes, indicating when to decode the timestamped unit pictures.

The encoded pictures are placed into at least one pack as shown in FIG. 4C. Illustratively, the I-picture (I3) is held in a V_PCK_I3 (532) and the B-picture (B1) in a V_PCK_B1 (533). Together with a NV_PCK 531, these packs make up a VOBU.

Figure 5:
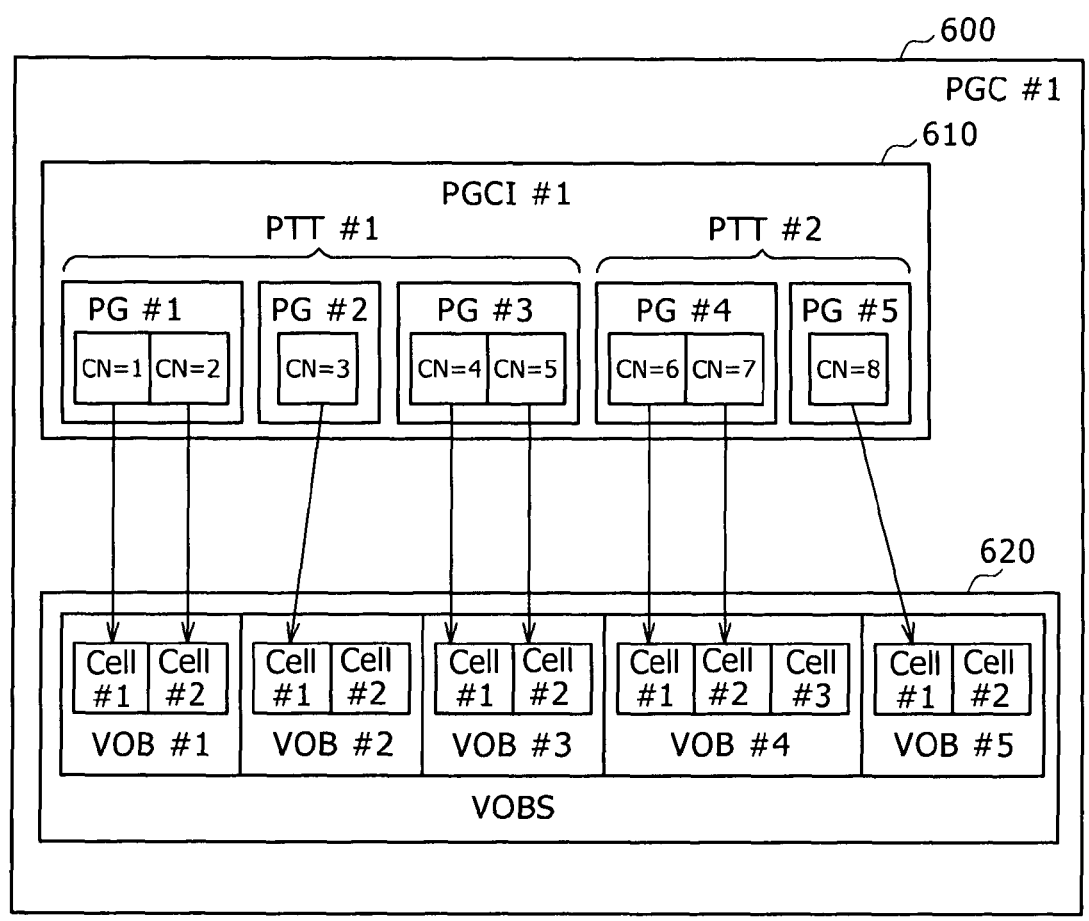
FIG. 5 is a schematic view showing the relations between program chain information (PGCI) and a video object set (VOBS) in a program chain (PGC)

FIG. 5 schematically shows the relations between program chain information (PGCI) and a video object set (VOBS) in a program chain (PGC). The program chain (PGC) 600 is made up of program chain information (PGCI) 610 indicative of the sequence in which to reproduce cells 762 (units of reproduction) and the video object set (VOBS) 620 that holds the cells 762.

As mentioned above, the VOB's and cells are assigned their ID numbers which do not necessarily denote the sequence of reproduction. The reproduction sequence is specified by the cell numbers in the PGCI 610. In the example of FIG. 5, according to the sequence of the cell numbers (CN) in the PGCI 610, cell reproduction of the VOBS 620 is performed in the order of cell #1 and cell #2 in VOB #1, cell #1 in VOB #2, cell #1 and cell #2 in VOB #3, cell #1 and cell #2 in VOB #4, and cell #1 in VOB #5.

In the program chain PGC 600, one or more cells having serial cell numbers may be defined as a program (PG). Each program is assigned a program number. One or more programs having serial program numbers may be defined as a chapter (PTT). In the example of FIG. 5, programs PG #1 through PG #3 are defined as a chapter PTT #1 and programs PG #4 and PG #5 as a chapter PTT #2. It follows that the first chapter is constituted by cell #1 and cell #2 in VOB #1, cell #1 in VOB #2, and cell #1 and cell #2 in VOB #3; and that the second chapter is made up of cell #1 and cell #2 in VOB #4, and cell #1 in VOB #5.

Figure 6:
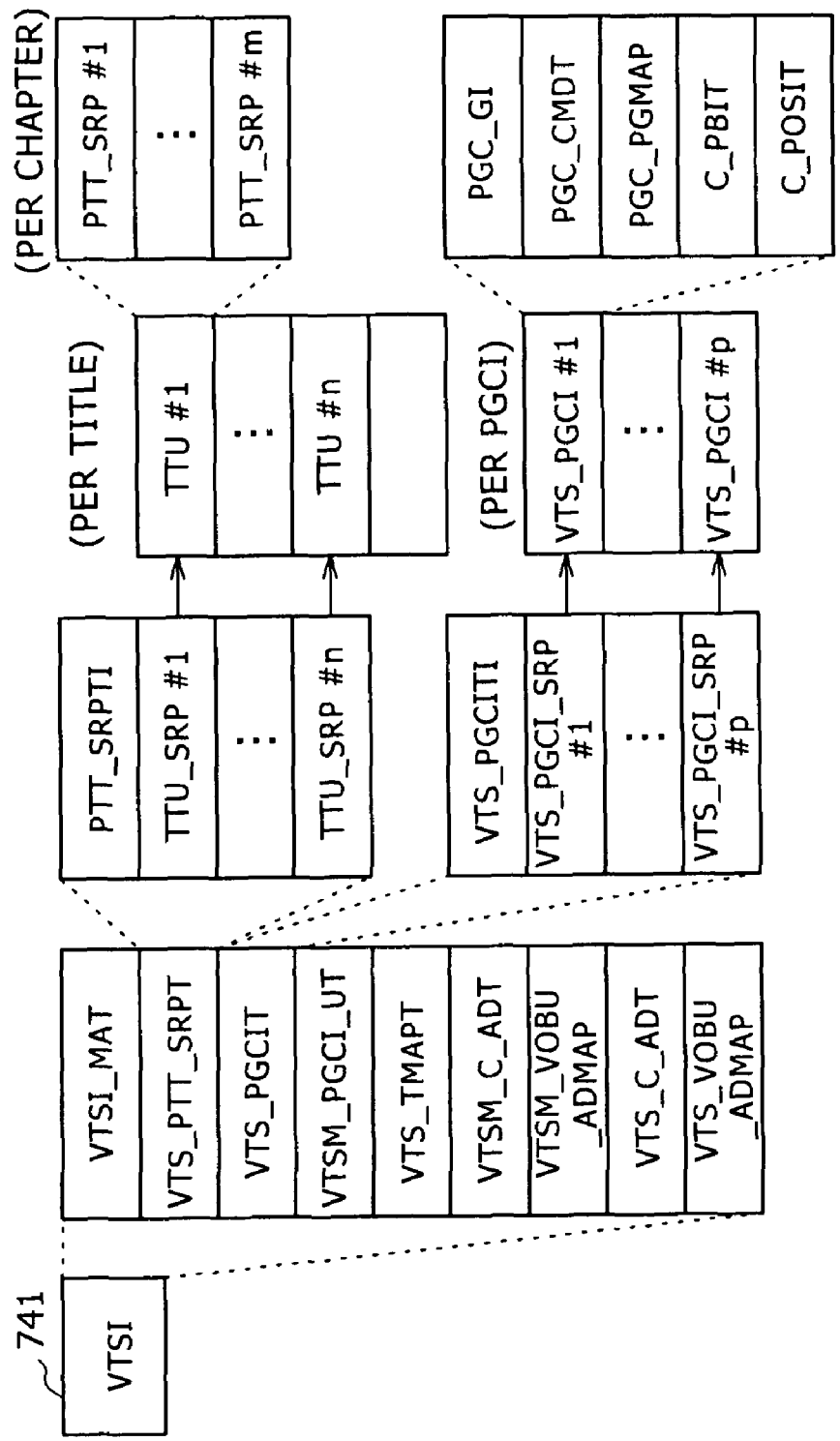
FIG. 6 is a schematic view showing a typical data structure of video title set information (VTSI)

FIG. 6 schematically shows a typical data structure of video title set information (VTSI). The video title set information (VTSI) 741 may have a data structure that includes a video title set information management table (VTSI_MAT), a video title set PTT search pointer table (VTS_PTT_SRPT), a video title set PGCI table (VTS_PGCIT), a video title set menu PGCI unit table (VTSM_PGCI_UT), a video title set time map table (VTS_TMAPT), a video title set menu cell address table (VTSM_C_ADT), a video title set menu VOBU address map (VTSM_VOBU_ADMAP), a video title set cell address table (VTS_C_ADT), and a video title set VOBU address map (VTS_VOBU_ADMAP).

The VTS_PTT_SRPT provides access information for access to the pointers to the chapters under each title. As explained above in reference to FIG. 2, the pointer PTT_SRP points to the starting position of each chapter. More specifically, each chapter is identified by the PGC number of the program chain PGC to which the chapter in question belongs and by the program number in the PGC. The TTU holds the PTT_SRP for each title, and the VTS_PTT_SRPT retains the pointer (TTU_SRP) to the TTU. Thus using the information included in the VTS_PTT_SRPT allows the PTT_SRP of the desired chapter to be read out. This makes it possible to know the starting position of the chapter of interest in the VTSTT_VOBS, as shown in FIG. 2.

The VTS_PGCIT in the VTSI provides information for access to the PGCI for control of the reproduction of a program chain in the video title set. At least one PGCI may be provided as needed in the video title set. A pointer (VTS_PGCI_SRP) to the VTS_PGCI is retained in the VTS_PGCIT.

The PGCI may have a data structure that includes PGC general information (PGC_GI), a PGC command table (PGC_CMDT), a PGC program map (PGC_PGMAP), a cell playback information table (C_PBIT), and a cell position information table (C_POSIT). The PGC command table PGC_CMDT holds the commands to be executed before, during, or after reproduction of cells. The PGC_PGMAP retains the starting cell number of each of the programs. The C_PBIT holds the categories of the cells and the starting address of the first VOBU in each of the cells. The C_POSIT contains the VOB_ID numbers and cell ID numbers of the cells. As a result, if the PGC number and PG number are known, the cell number of the starting cell in a given program can be acquired from the PGC_PGMAP. Given the C_POSIT, the VOB_ID number and cell ID number can be acquired from a specific cell number. These arrangements make it possible to know particular position information in the VOBS as shown in FIG. 5. That is, from the PGC number and PG number in the PTT_SRP, it is possible to acquire the VOB_ID number and cell ID number in the VTSTT_VOBS.

FIG. 7 schematically shows a typical internal structure of a face information pack 769 according to the embodiment of the present invention. The embodiment is assumed to detect the position where the number of face images changes as a delimiting position between scenes and to create a representative picture of moving picture data based on the detected position.

As with the above-mentioned video pack 765 and audio pack 766, the face information pack 769 is placed in a video object unit (VOBU) 763. It is preferred that the face information pack 769 be placed not in every VOBU but only in a specific VOBU. If the information about faces is assumed to be analyzed during an imaging session so that the face-related information may be stored collectively at the end of the session, then that information should preferably be placed into the last VOBU or into a VOBU a predetermined number of units earlier than the last unit as a matter of convenience.

The face information pack 769 includes a pack header followed by a face information packet. The face information packet contains a packet header followed by a sub-stream identifier and face information data. The packet header of the face information packet includes a stream identifier that identifies the stream type in effect. In this case, the stream identifier holds "10111101 (binary number)" indicating a private stream (private_stream_1) that needs to be synchronized with other streams. The sub-stream identifier following the packet header retains "11111111 (binary number)" indicating a provider defined stream.

FIG. 8 is a tabular view listing a typical structure of face information data according to the embodiment of the invention.

The face information data is made up of a face information identifier (CAO_ID), face information properties (CAO_FACE_INFO), and a face information body. The face information body contains face detection information (FACE_DETECT_INFO) and face block information (FACE_BLOCK).

The face information identifier contains a face information data identifier (CAO_DAT_ID) and a face information version (CAO_DAT_VER) indicating the version of the face information in effect. Different face information versions may involve different formats of face information.

The face information properties retain a face information size (CAO_FINFO_SIZE), a face information data version (FACE_DAT_VER), a face block information flag (FBLK_STRUCT_FLG), a time scale (FBLK_TIMESCALE), a face block information data count (FBLK_Ns), a face detection information size (FDETECT_INF_SIZE), and a face block information data size (FBLK_SIZE).

The face information size is a field that designates the entire size of the face information. The face information data version is a field that designates the version of the face information. The face block information flag is a group of significant flags indicating what is described in the face information body. The individual flags will be explained later in connection with the face information.

The time scale is a field that designates the unit of time for the face block information. The face block information data count is a field that indicates the number of face block information data. The face detection information size is a field that designates the size of the face detection information. The face block information data size is a field that indicates the size of a single block of the face block information.

The face detection information includes a face detection cell number (CELL_ID) and a face detection position (OFFSET). The face detection cell number is a field that indicates the number of the cell in which faces were detected. The face detection position is a field that indicates the position where faces were detected. More specifically, the face detection position points to the position of the navigation pack in the video object unit (VOBU) in which faces were detected, the position being determined in increments of packs relative to the beginning of the video object set (VOBS) in question.

The face block information includes a face detection time offset (FACE_DETECT_TIME_OFFSET), face basic information (FACE_BASIC_INFO), face score information (FACE_SCORE), and face expression information (FACE_EXPRESSION_INFO_1). The face detection time offset is a field that indicates an offset time relative to the beginning of the chapter in effect when faces were detected. The face basic information is a field that designates the X coordinate (X), Y coordinate (Y), width (WIDTH) and height (HEIGHT) of the detected face(s). The face score information is a field that gives the score indicating how what has been detected is likely to be a face(s). The face expression information is a field that indicates the expression of the detected face(s), such as whether the face is smiling or not. Whether significant data is retained in the face detection time offset, face basic information, face score information, and face expression information subsumed under the face block information is indicated by the group of significant flags in the above-mentioned face block information flag.

Figure 9:
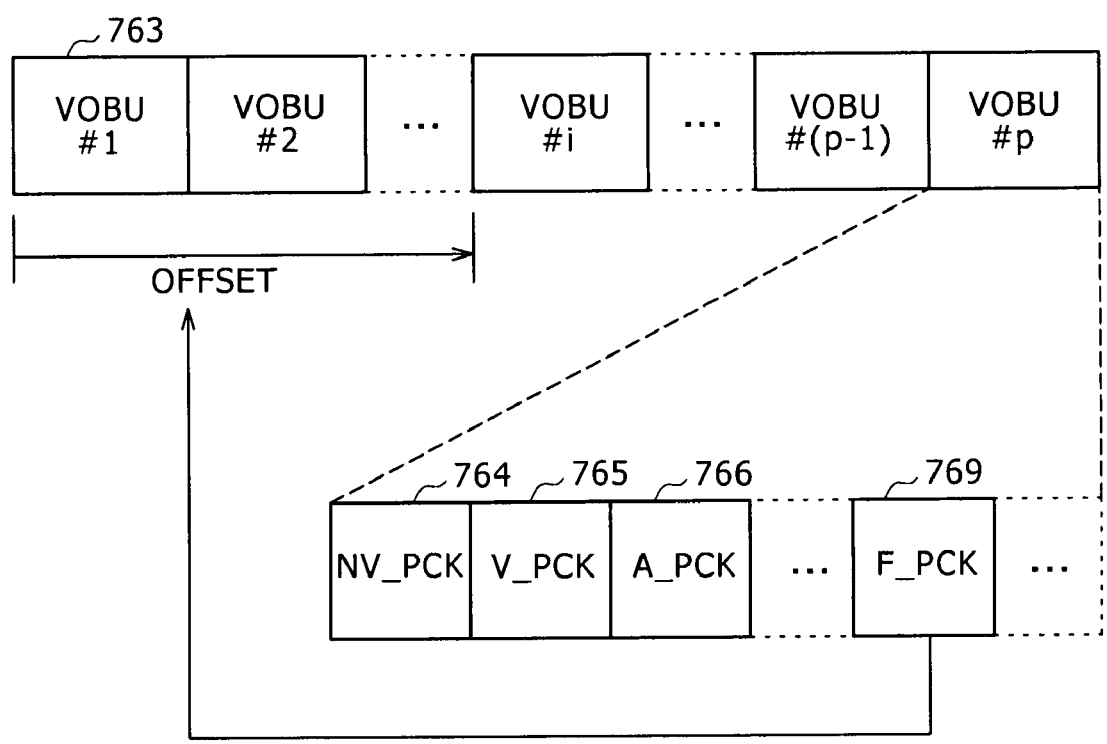
FIG. 9 is a schematic view showing how a representative picture is identified by face information data according to the embodiment of the invention.

FIG. 9 schematically shows how a representative picture is identified by face information data according to the embodiment of the invention.

It is assumed here that the face information pack 769 is placed in the last VOBU #p of the video object units VOBU's 763. The VOBU #i is identified on the basis of the face detection position (OFFSET) in the face detection information of the face information pack 769, and a face thumbnail is created from the I-picture included in the video pack 765 of the VOBU #i.

Where the above-mentioned face detection time offset is utilized in combination, the elapsed time from the beginning of the chapter may be displayed on the screen.

Figure 10:
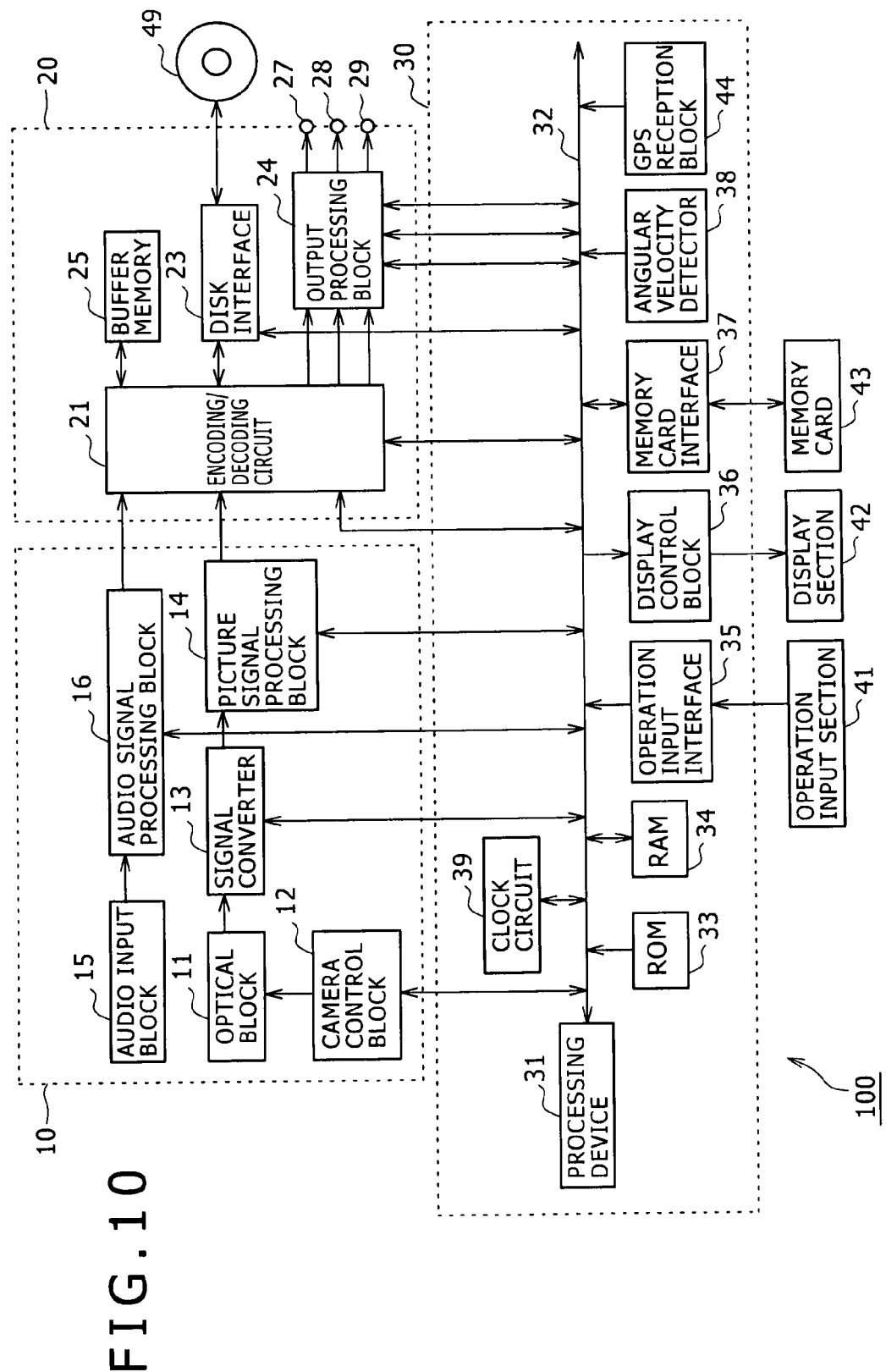
FIG. 10 is a block diagram showing a typical structure of a picture recording apparatus practiced as an imaging apparatus embodying the present invention.

FIG. 10 is a block diagram showing a typical structure of a picture recording apparatus practiced as an imaging apparatus 100 embodying the present invention. The imaging apparatus 100 includes a camera section 10, a recording and reproduction processing section 20, and a control section 30.

The camera section 10 is made up of an optical block 11, a camera control block 12, a signal converter 13, a picture signal processing block 14, an audio input block 15, and an audio signal processing block 16. The optical block 11 includes interiorly a group of lenses, an aperture control mechanism, a focusing mechanism, a zoom mechanism, a shutter mechanism, a flash mechanism, and an image stabilizer for imaging objects. On receiving control signals from the control section 30, the camera control block 12 generates control signals to be fed to the optical block 11. The control signals thus generated are supplied to the optical block 11 for control of the zoom, shutter, and exposure settings, among others.

The signal converter 13 is constituted illustratively by an imaging device such as CCD (charge coupled device). Images coming through the optical block 11 are formed on the imaging plane of the signal converter 13. In response to an image pickup timing signal supplied by the control section 30 following a shutter operation, the signal converter 13 converts the object image formed on its imaging plane into a picture signal and sends the signal to the picture signal processing block 14.

Based on the control signals from the control section 30, the picture signal processing block 14 subjects the picture signal to such processes as gamma correction and AGC (auto gain control) and further converts the signal to a digital picture signal. The audio input block 15 picks up sounds near the object being imaged. An audio signal created by the audio input block 15 is sent to the audio signal processing block 16. Given the control signals from the control section 30, the audio signal processing block 16 submits the audio signal to such processes as gamma correction and AGC and converts the audio signal to a digital signal.

The recording and reproduction processing section 20 is made up of an encoding/decoding circuit 21, a disk interface 23, an output processing block 24, and a buffer memory 25.

The encoding/decoding circuit 21 provides the encoding capability whereby the picture and audio signals as well as additional recording information coming from the camera section 10 are encoded according to the MPEG standard or the like before being multiplexed and compressed. The encoding/decoding circuit 21 also offers the decoding capability whereby compressed data is decoded and separated into a picture signal, an audio signal, and additional recording information. Furthermore, based on the control signals from the control section 30, the encoding/decoding circuit 21 subjects the picture signal from the picture signal processing block 14 to such processes as automatic white balance control, exposure correction control, and scale-up control relative to the digital zoom magnification in effect.

The disk interface 23 receives compressed data from the encoding/decoding circuit 21 and writes the received data to a disk 49. The disk interface 23 further reads compressed data from the disk 49 and forwards the retrieved data to the encoding/decoding circuit 21. Under control of the control section 30, the output processing block 24 sends the compressed data coming from the encoding/decoding circuit 21 to the control section 30 as well as to output terminals 27 through 29. The buffer memory 25 is illustratively composed of an SDRAM (synchronous dynamic random access memory) and serves as a work area for use by the encoding/decoding circuit 21 for encoding or decoding work.

The control section 30 is made up of a processing device 31, a ROM (read only memory) 33, a RAM (random access memory) 34, an operation input interface 35 to be connected with an operation input section 41, a display control block 36 to be connected with a display section 42, a memory card interface 37 to be loaded with a memory card 43, an angular velocity detector 38 to detect angular velocity for image stabilization, a clock circuit 39 for recording image pickup times, and a GPS (global positioning system) reception block 44, all interconnected via a system bus 32.

The processing device 31 provides overall control of the control section 30 and utilizes the RAM 34 as its work area. Diverse programs are written in the ROM 33, including programs to control the camera section 10 and programs to control recording and reproduction of picture signals and audio signals.

The operation input section 41 connected to the operation input interface 35 is furnished with a plurality of keys including a mode changeover key for changeover between picture-taking mode, reproduction mode, and other modes; zoom control keys, an exposure control key, a shutter key, a moving-picture taking key, and keys for display control of the display section 42. The operation input interface 35 forwards the operation signals coming from the operation input section 41 to the processing device 31. The processing device 31 determines which key has been operated on the operation input section 41 and performs control processing accordingly.

The display section 42 connected to the display control block 36 is illustratively formed by an LCD (liquid crystal display). Under control of the processing device 31, the display section 42 displays the picture signals coming from the camera section 10 or retrieved from the disk 49.

The memory card interface 37 writes the compressed data coming from the encoding/decoding circuit 21 to the memory card 43. The memory card interface 37 further reads compressed data from the memory card 43 and supplies the retrieved data to the encoding/decoding circuit 21.

The clock circuit 39 generates time information that denotes times of day in years, months, days, hours, minutes, and seconds. The angular velocity detector 38 is a gyroscope that detects angular velocity applied to the imaging apparatus 100 from the outside. Angular velocity information [$\omega=(\theta/\text{sec})$] from the angular velocity detector 38 is conveyed at predetermined intervals to the processing device 31. The GPS reception block 44 receives radio waves from GPS (Global Positioning System) satellites in order to acquire the current position of the imaging apparatus 100.

Figure 11:
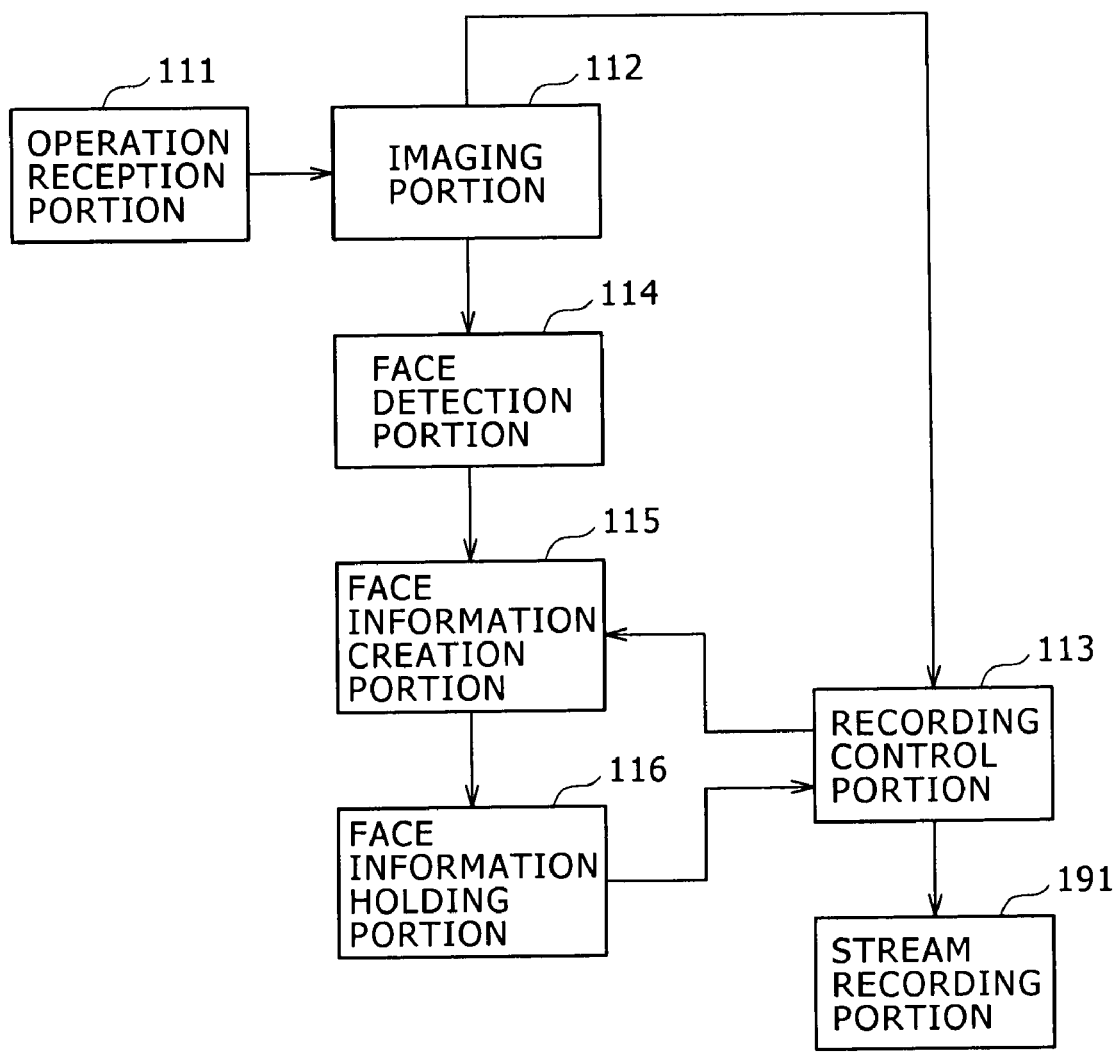
FIG. 11 is a schematic view showing a typical functional structure of the inventive imaging apparatus for creating face information.

FIG. 11 schematically shows a typical functional structure of the inventive imaging apparatus 100 of the embodiment for creating face information.

An operation reception portion 111 receives operation input from the user and is implemented by the operation input section 41. Commands are issued to an imaging portion 112 on the basis of the operation input received by the operation reception portion 111.

The imaging portion 112 creates moving picture data by imaging objects and is implemented illustratively by the camera section 10. The moving picture data acquired by the imaging portion 112 is sent to a recording control portion 113 and a face detection portion 114.

The recording control portion 113 exercises control so that the acquired moving picture data and face information related to the acquired data are recorded to a stream recording portion 191. Typically, the recording control portion 113 is implemented by the recording and reproduction processing section 20.

The face detection portion 114 detects face images from the pictures making up the acquired moving picture data, thereby obtaining information about the detected face images. The information thus acquired by the face detection portion 114 is supplied to a face information creation portion 115.

The face information creation portion 115 creates face information data about the face images detected by the face detection portion 114. The format in which the face information data is given is constituted illustratively as shown in FIG. 8. The face information data created by the face information creation portion 115 is retained by a face information holding portion 116.

The face information holding portion 116 holds the face information data created by the face information creation portion 115. As the face detection portion 114 keeps detecting face images, the face information holding portion 116 stores the acquired face information data continuously in a cumulative manner.

The stream recording portion 191 is a recording medium that records acquired moving picture data and face information data as stream data. Illustratively, the stream recording portion 191 is implemented in the form of a disk complying with the DVD-Video standard. In the same manner as the video pack 765 and audio pack 766 are recorded in VOBU's as shown in FIG. 3, the face information data is placed as a face information pack 769 into the last VOBU or into a VOBU a predetermined number of units earlier than the last unit.

Figure 12:
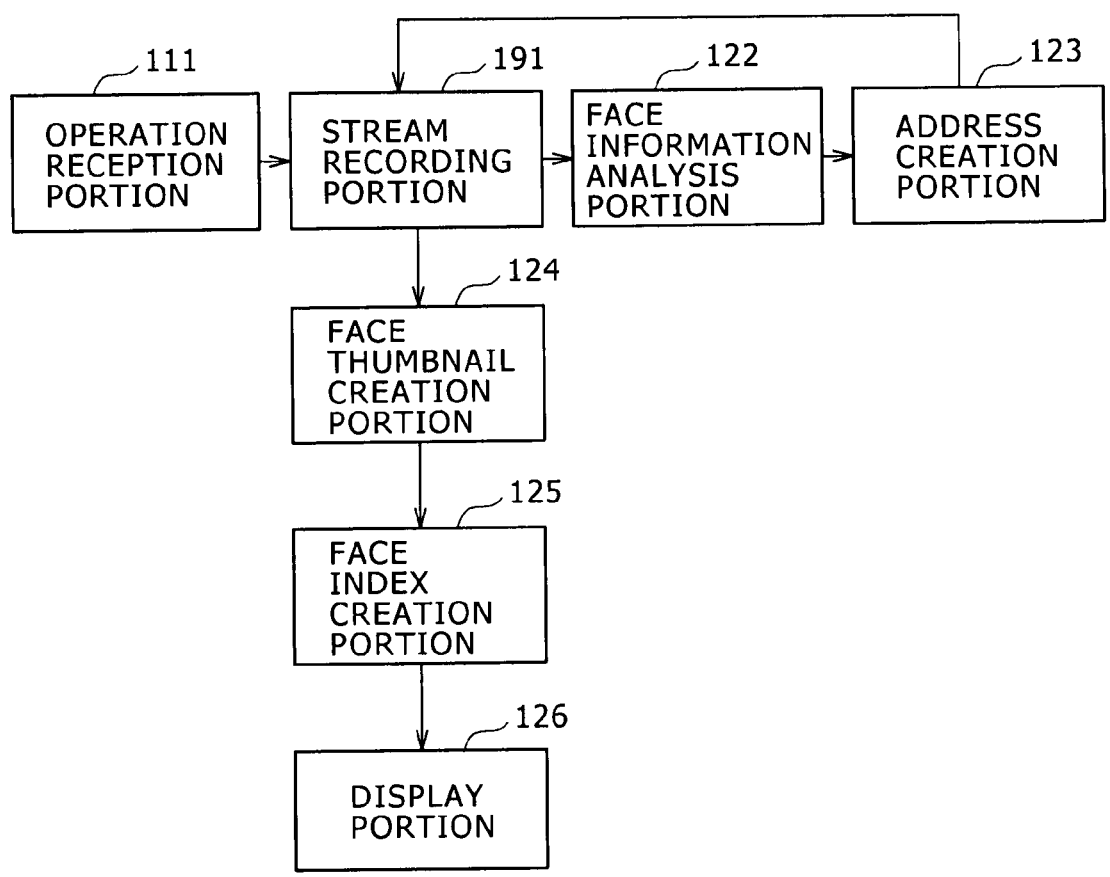
FIG. 12 is a schematic view showing a typical functional structure of the inventive imaging apparatus for giving a face index display.

FIG. 12 schematically shows a typical functional structure of the inventive imaging apparatus 100 of the embodiment for giving a face index display.

The operation reception portion 111 and stream recording portion 191 are the same as those explained above in reference to FIG. 11. In the example of FIG. 12, face information data recorded in the stream recording portion 191 is retrieved from there as index data on the basis of the operation input received by the operation reception portion 111.

A face information analysis portion 122 identifies the picture suitable for index display by analyzing face information data. More specifically, the face information analysis portion 122 identifies the picture suitable for index display by use of the face detection position ("OFFSET" in FIG. 8) in the face detection information of the face information pack 769. That is, the picture to be displayed for index purposes is identified in increments of packs relative to the beginning of the video object set (VOBS).

An address creation portion 123 creates an appropriate address located in the stream recording portion 191 in accordance with the face detection position supplied by the face information analysis portion 122, the address being such as to allow the picture suitable for index display to be accessed. Since the face detection position is given in increments of 2,048-byte packs, a corresponding byte address is given by multiplying the pack increment position by 2,048.

A face thumbnail creation portion 124 acquires the picture from the stream recording portion 191 by use of the address created by the address creation portion 123, and creates a face thumbnail from the acquired picture. More specifically, the face thumbnail creation portion 124 acquires the I-picture from the VOBU identified by the address created by the address creation portion 123, and reduces the acquired I-picture into a face thumbnail.

A face index creation portion 125 creates a face index display screen by utilizing the face thumbnails created by the face thumbnail creation portion 124. The face index display screen will be discussed later in reference to FIG. 14.

A display portion 126 displays the face index display screen created by the face index creation portion 125.

Figure 13:
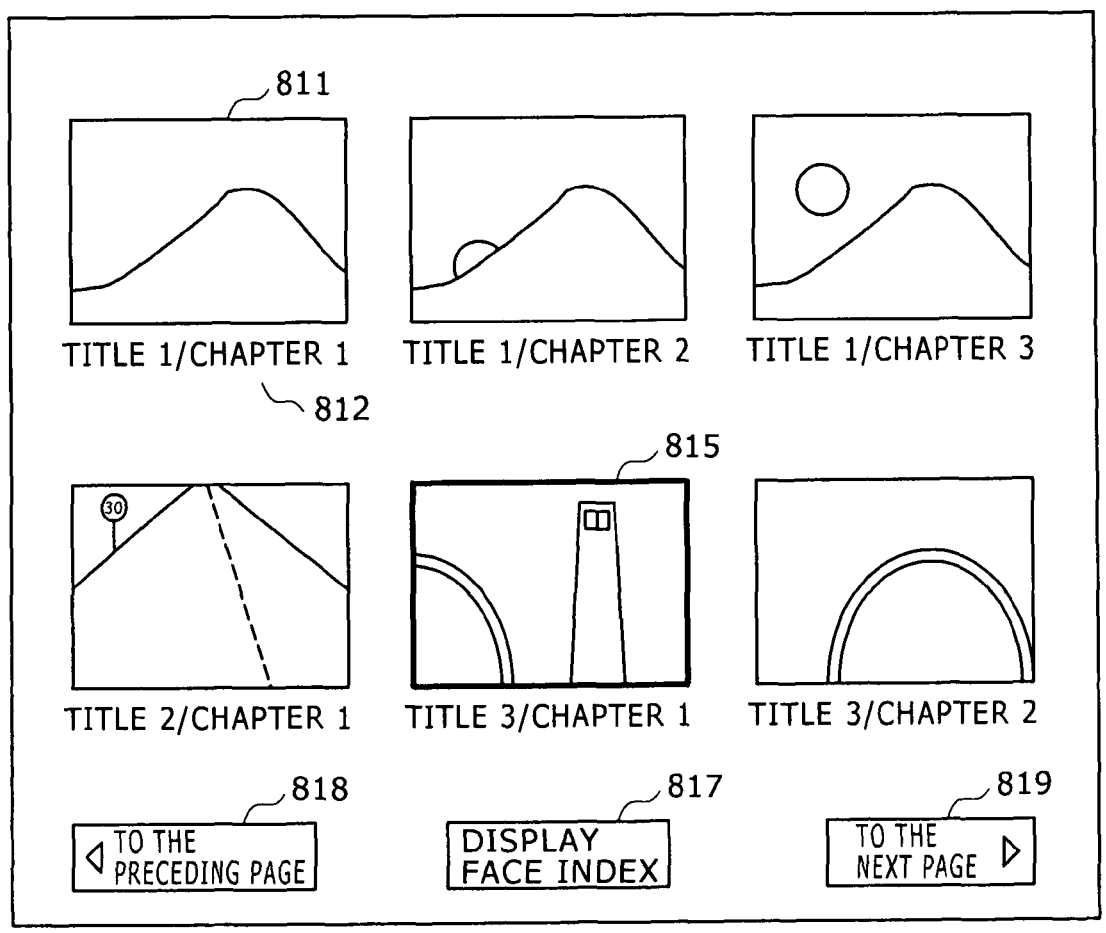
FIG. 13 is a schematic view showing a typical chapter display screen according to the embodiment of the invention.

FIG. 13 schematically shows a typical chapter display screen according to the embodiment of the invention. The chapter display screen displays as thumbnails 811 the representative pictures of the chapters recorded on the disk. Under each thumbnail 811 appears a title number/chapter number 812 of a specific chapter.

In the example of FIG. 13, six chapters are represented on a single screen. To get other chapters representatively displayed requires changing screen pages. Screen pages are changed by operating a Previous Page button 818 or a Next Page button 819. In order to display the face index display screen regarding the selected chapter, the user presses a Display Face Index button 817.

The user calls up the chapter display screen by operating the Menu key, one of the operation keys. A highlight display may be moved by operating arrow keys in four directions. Reproduction of the selected chapter may be started or a different page may be displayed by operating an Enter key located in the middle of the arrow keys.

The pages on the chapter display screen may be recorded to the VMGM_VOBS 732 as picture data. The thumbnails 811 are also pasted as part of the menu pages. A selection frame 815 for selection of a thumbnail on the screen by the user operating a remote controller or other operation keys is defined as a sub-picture. Such highlight display is controlled using highlight information (HLI) as part of the PCI 772 (FIG. 3) in the NV_PCK 764. If these menu pages are recorded as new pages on the medium, then the face index display screen can be displayed when the data is subsequently reproduced from the medium by a commonly available DVD player.

Figure 14:
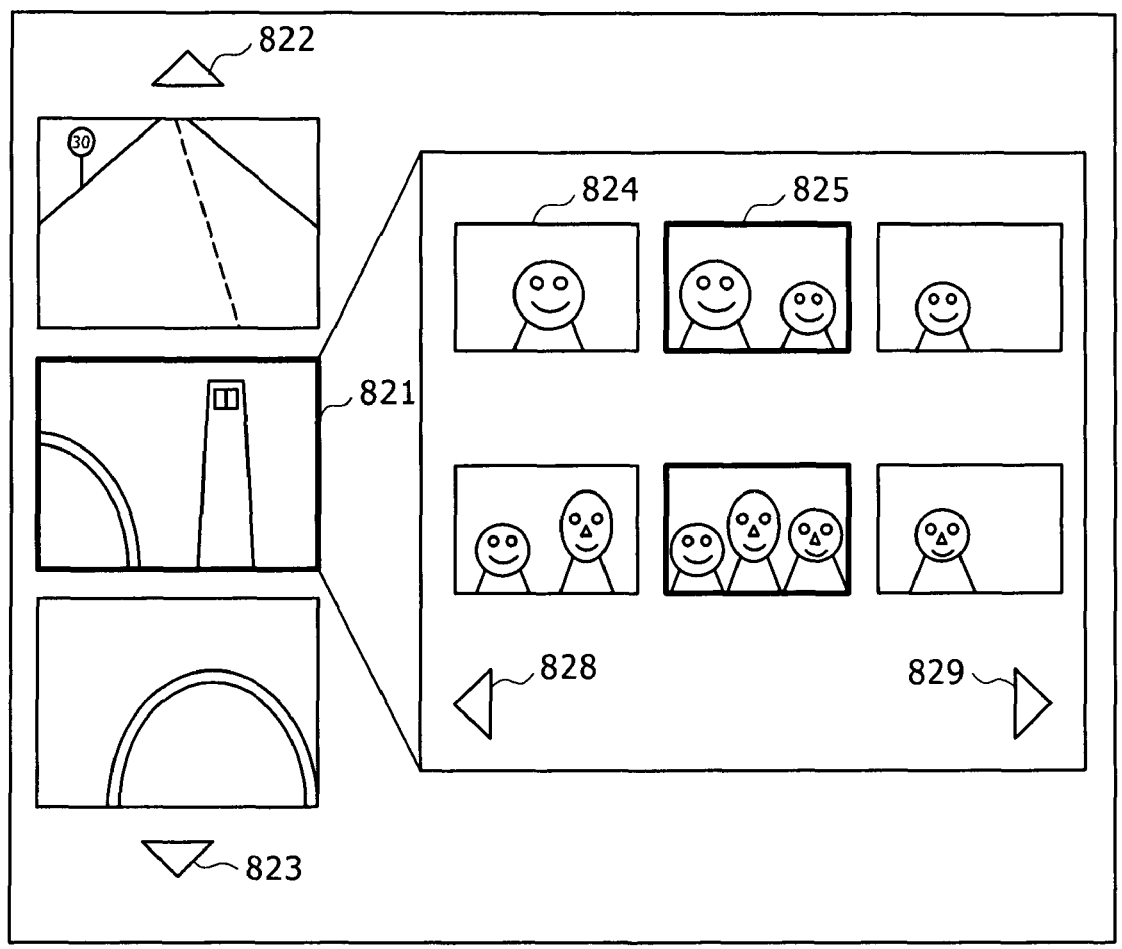
FIG. 14 is a schematic view showing a typical face index display screen according to the embodiment of the invention.

FIG. 14 schematically shows a typical face index display screen according to the embodiment of the invention. Operating the Display Face Index button 817 on the chapter display screen causes the face index display screen of the selected chapter 821 to appear on the screen.

The face index display screen displays a representative picture 824 of each of the scenes that are delimited by points where the number of faces detected from the chapter 821 changes. As with the chapter display screen, a selection frame 825 appears on the face index display screen for use in selecting a desired representative picture 824, the selection frame 825 being moved by operation of a remote controller or other operation keys.

In the example of FIG. 14, six representative pictures are displayed on a single screen. In order to display other representative pictures, the user needs to change screen pages by operating a Preceding Page button 828 or a Next Page button 829. In this example, three chapters are indicated representatively on one screen. In order to display other chapters, the user needs to change displayed chapters by operating a Preceding Chapter button 822 or a Next Chapter button 823.

On the face index display screen, the user may also move the highlight display by operating the arrow keys in four directions. Reproduction of the selected chapter may be started or a different page may be displayed by operating an Enter key located in the middle of the arrow keys.

Figure 15:
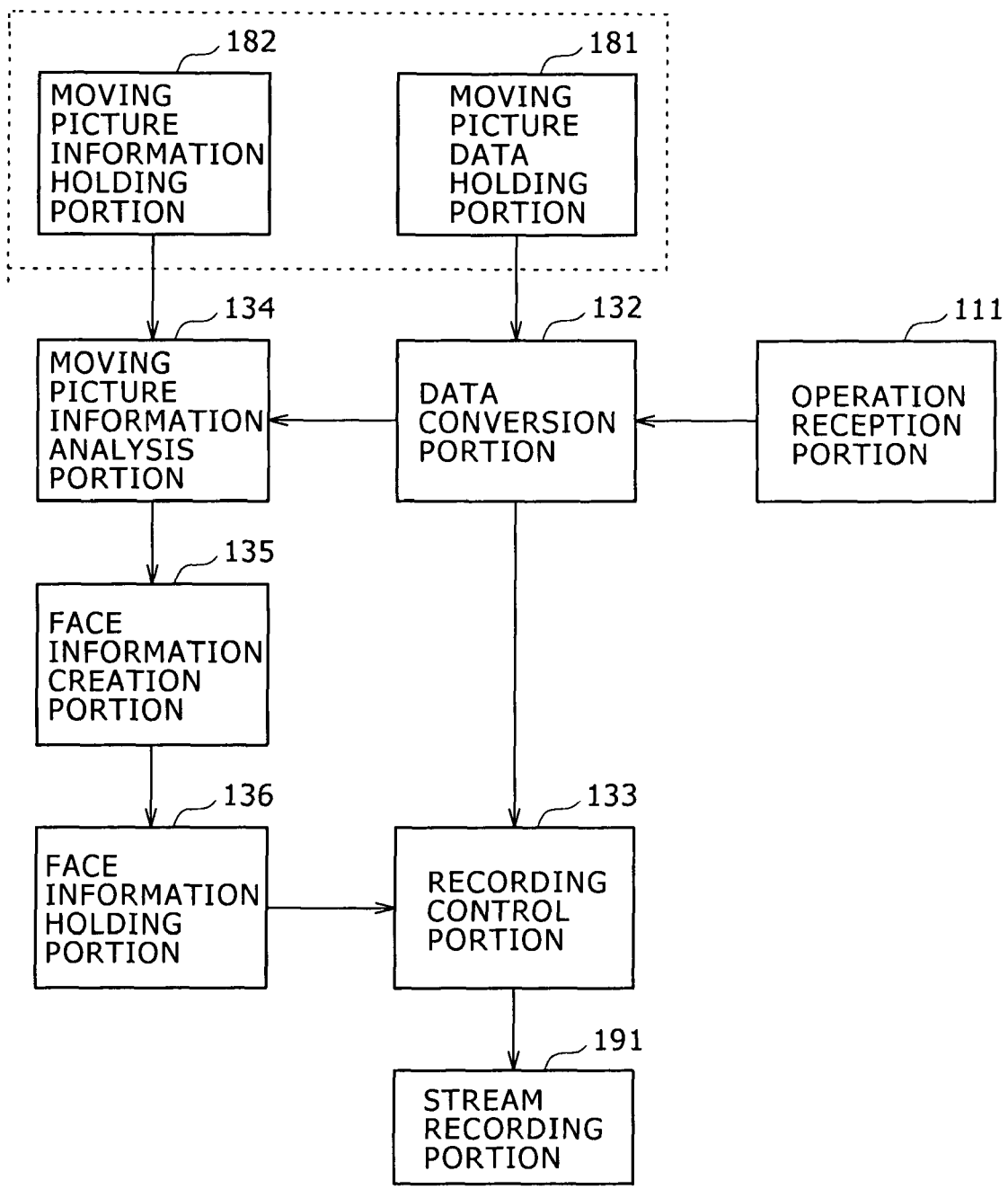
FIG. 15 is a schematic view showing a typical functional structure of the inventive imaging apparatus for converting moving picture data.

FIG. 15 schematically shows a typical functional structure of the inventive imaging apparatus 100 of the embodiment for converting moving picture data. Whereas the functional structure in FIG. 11 was shown detecting faces during imaging and storing the resulting face information into stream data, the functional structure in FIG. 15 applies where there exists moving picture information independent of moving picture data and where the moving picture data is converted in accordance with such independent moving picture information. For example, where face information is stored as a meta file apart from moving picture data, the moving picture data and the face information may be recorded integrally as a single stream of data by this functional structure.

The operation reception portion 111 and stream recording portion 191 are the same as those discussed above in reference to FIG. 11. In the example of FIG. 15, data conversion is carried out based on the data conversion instruction input received by the operation reception portion 111, and the resulting stream data is recorded to the stream recording portion 191.

A moving picture data holding portion 181 holds moving picture data. A moving picture information holding portion 182 retains moving picture information about the moving picture data. In this case, it is assumed that the moving picture information about the moving picture data is held in a file apart from the moving picture data holding portion 181.

A data conversion portion 132 converts the moving picture data held by the moving picture data holding portion 181 into the format of stream data in accordance with the instructions from the operation reception portion 111. Illustratively, the data conversion portion 132 is implemented by the processing device 31. The converted stream data is supplied to the recording control portion 133.

The recording control portion 133 exercises control so that the stream data converted by the data conversion portion 132 is recorded to the stream recording portion 191. Typically, the recording control portion 133 is implemented by the recording and reproduction processing section 20.

A moving picture information analysis portion 134 reads from the moving picture information holding portion 182 the moving picture information about the moving picture data targeted for conversion by the data conversion portion 132. The moving picture information analysis portion 134 proceeds to analyze the retrieved moving picture information and acquire information about the face images involved. Illustratively, the moving picture information analysis portion 134 is implemented by the processing device 31.

A face information creation portion 135 creates face information data about the face images acquired by the moving picture information analysis portion 134. A typical format of face information data is shown in FIG. 8. The face information data created by the face information creation portion 135 is retained by a face information holding portion 136.

The face information holding portion 136 holds the face information data created by the face information creation portion 135. The face information holding portion 136 keeps accumulating face information data as more and more face images are acquired by the moving picture information analysis portion 134. The face information data is stored by the recording control portion 133 as part of the stream data. That is, as with the video pack 765 and audio pack 766 in the VOBU in FIG. 3, the face information data is stored by the stream recording portion 191 as the face information pack 769 in the last VOBU or in a VOBU a predetermined number of units earlier than the last unit.

Figure 16:
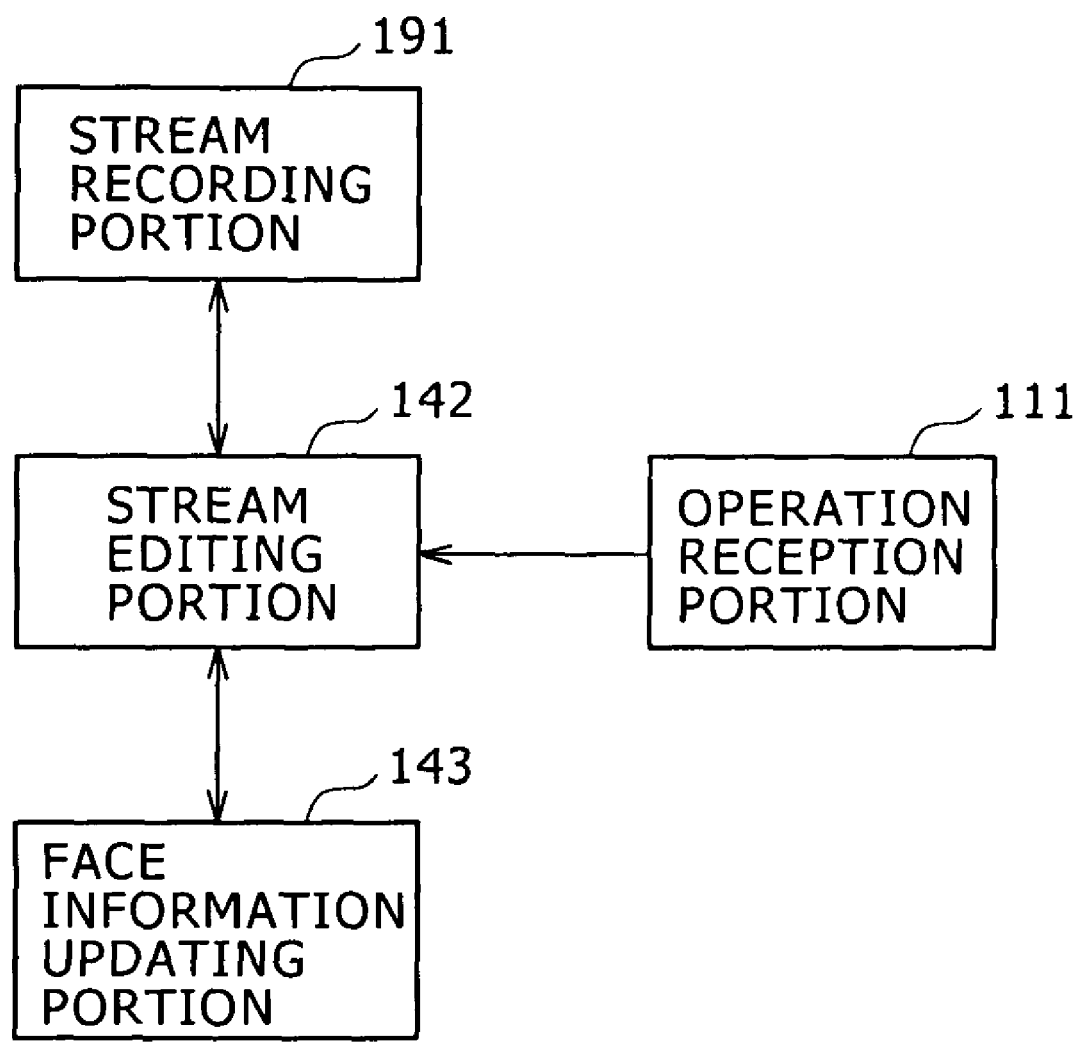
FIG. 16 is a schematic view showing a typical functional structure of the inventive imaging apparatus for editing moving picture data.

FIG. 16 schematically shows a typical functional structure of the inventive imaging apparatus 100 of the embodiment for editing moving picture data. Below is a description of how face information data is updated by this functional structure when the stream data recorded in the stream recording portion 191 is edited dividedly.

The operation reception portion 111 and stream recording portion 191 are the same as those discussed above in reference to FIG. 11. In the example of FIG. 16, the stream data recorded in the stream recording portion 191 is edited in accordance with the data editing instruction input received by the operation reception portion 111.

A stream editing portion 142 allows the stream data recorded in the stream recording portion 191 to be edited dividedly based on the data editing instruction input received by the operation reception portion 111.

A face information updating portion 143 updates the face information data in the stream data having undergone the divided editing by the stream editing portion 142. Specifically, with regard to the stream data subsequent to a division point, the face information data preceding the division point is deleted from the original face information data. Regarding the stream data preceding the division point, the face information data preceding the division point is extracted from the original face information data and added as new face information data. The face information data preceding the division point and the stream data subsequent to the division point are recorded as separate streams of data to the stream recording portion 191 by way of the stream editing portion 142.

How the imaging apparatus 100 embodying the present invention works will now be described in reference to the relevant drawings.

Figure 17:
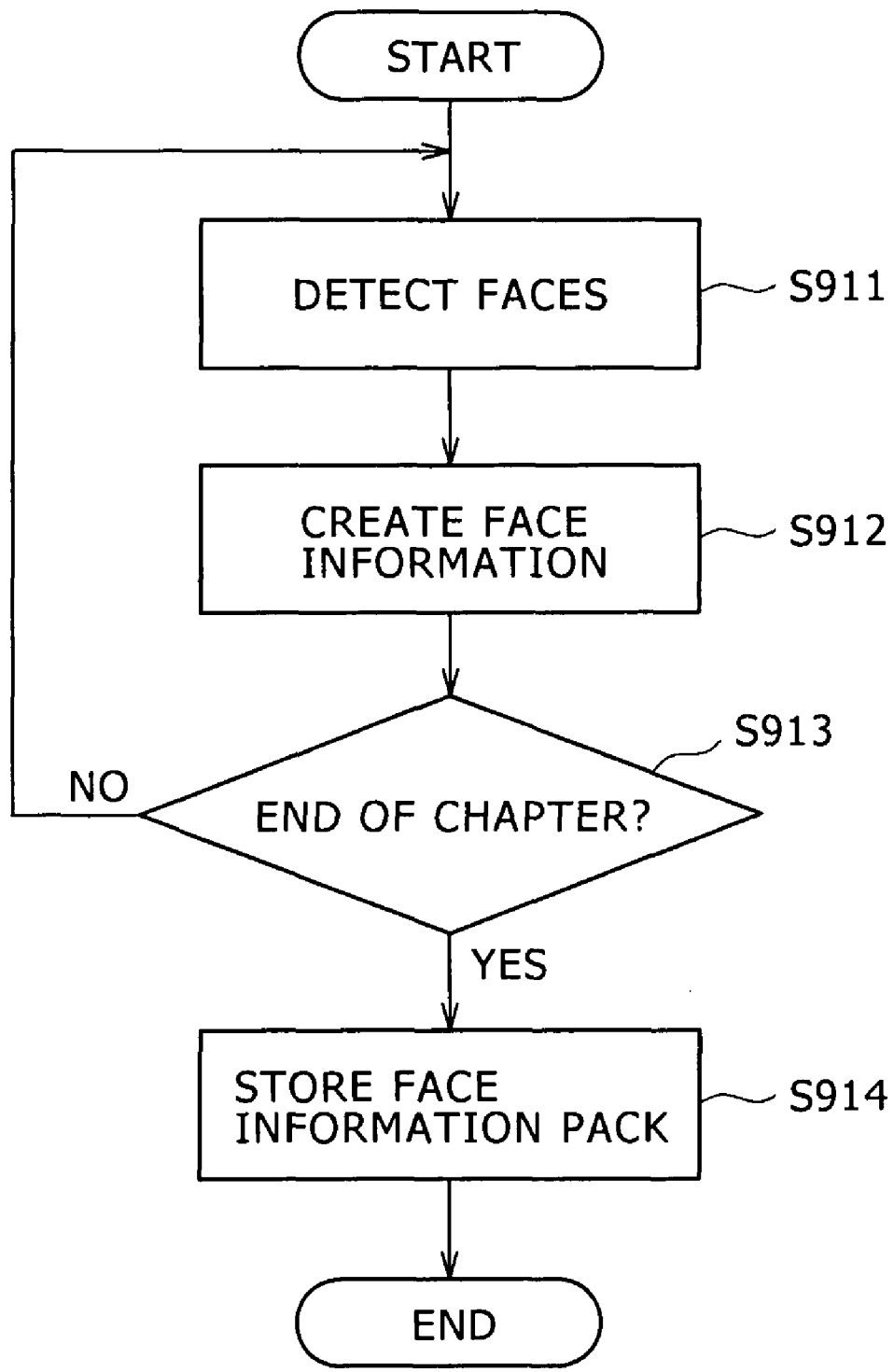
FIG. 17 is a flowchart of steps constituting a typical procedure for creating face information during imaging according to the embodiment of the invention.

FIG. 17 is a flowchart of steps constituting a typical procedure for creating face information during imaging according to the embodiment of the invention.

Given the instruction to take pictures from the operation reception portion 111, the face detection portion 114 in step S911 detects face images from the pictures which are being taken by the imaging portion 112 and which constitute moving picture data, thus acquiring relevant information about the face images. In step S912, the face information creation portion 115 creates face information data about the face images detected in step S911. These steps are repeated until the end of the current chapter is reached in step S913.

When the imaging of the current chapter comes to an end, the recording control portion 113 in step S914 records face information about the acquired moving picture data to the stream recording portion 191. Specifically, the face information pack 769 is placed into the last VOBU or into a VOBU a predetermined number of units earlier than the last unit.

Figure 18:
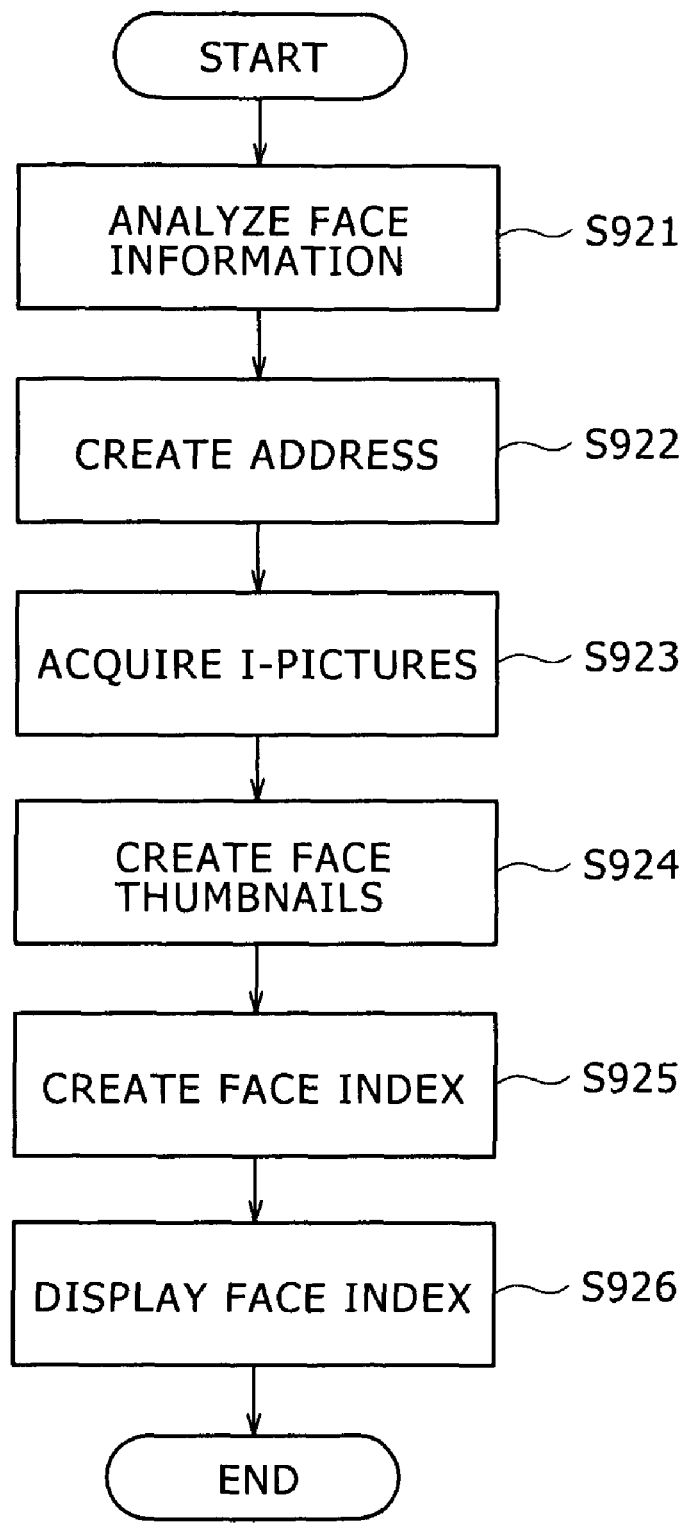
FIG. 18 is a flowchart of steps constituting a typical procedure for giving a face index display according to the embodiment of the invention.

FIG. 18 is a flowchart of steps constituting a typical procedure for giving a face index display according to the embodiment of the invention.

In step S921, the face information data recorded in the stream recording portion 191 is analyzed by the face information analysis portion 122 and the picture suitable for index display is identified. In step S922, the address creation portion 123 creates a relevant address located in the stream recording portion 191, the address being such as to allow the picture suitable for index display to be accessed. In step S923, the face thumbnail creation portion 124 acquires the I-picture contained in the VOBU identified by the address thus created. In step S924, the face thumbnail creation portion 124 reduces the I-picture into a face thumbnail.

In step S925, the face index creation portion 125 creates a face index display screen using the face thumbnail thus created. In step S926, the display portion 126 displays the face index display screen.

Figure 19:
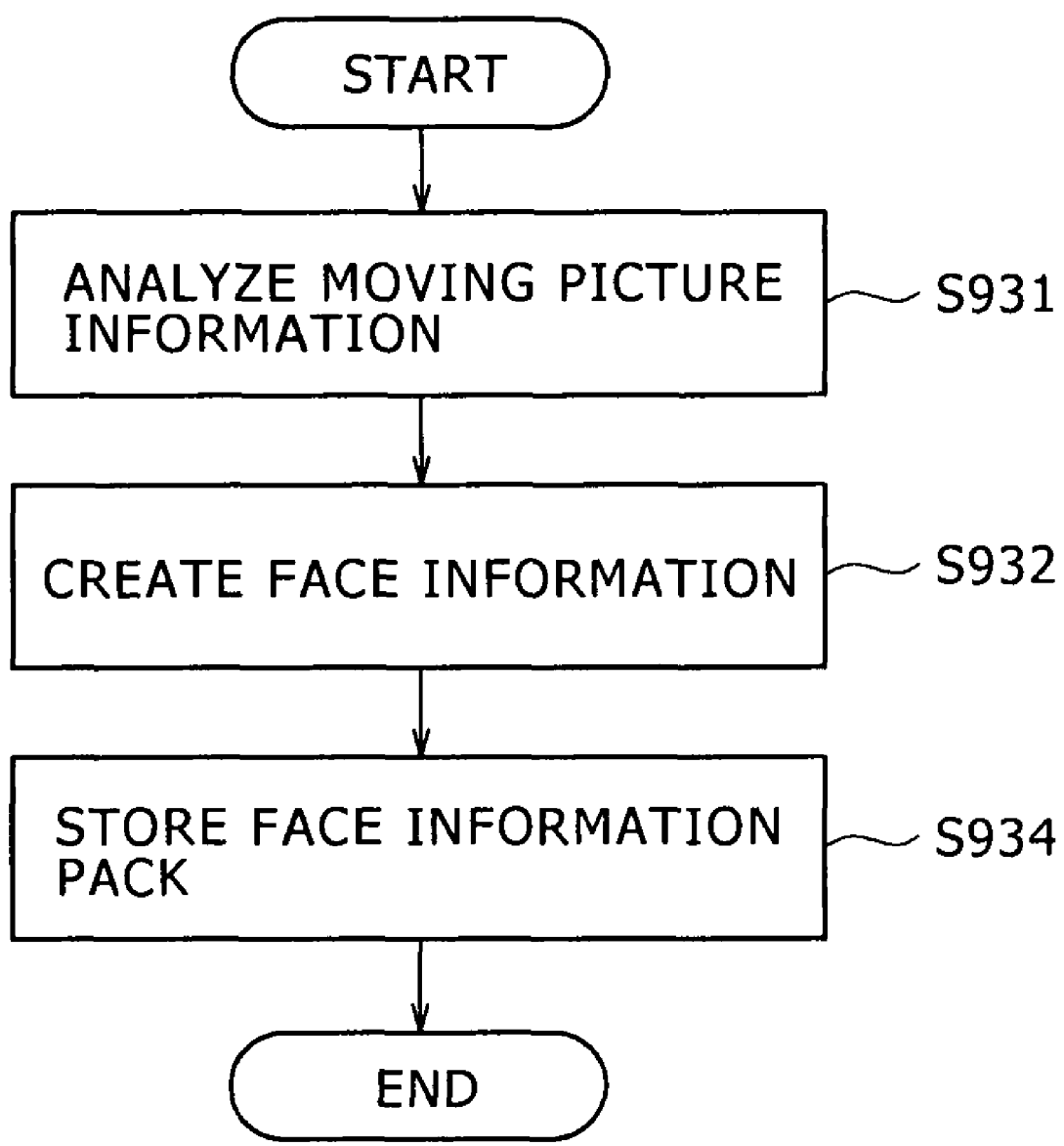
FIG. 19 is a flowchart of steps constituting a typical procedure for creating face information upon conversion of moving picture data according to the embodiment of the invention.

FIG. 19 is a flowchart of steps constituting a typical procedure for creating face information upon conversion of moving picture data according to the embodiment of the invention.

Initially, the data conversion portion 132 reads from the moving picture information holding portion 182 the moving picture information about the moving picture data targeted for conversion. In step S931, the moving picture information analysis portion 134 analyzes the moving picture information so as to acquire information about the face image of interest. In step S932, the face information creation portion 135 creates face information data about the face image acquired in step S931. At the end of the moving picture data conversion, the recording control portion 113 records the face information about the converted moving picture data to the stream recording portion 191 in step S934. Specifically, the face information pack 769 is placed into the last VOBU or into a VOBU a predetermined number of units earlier than the last unit.

Figure 20:
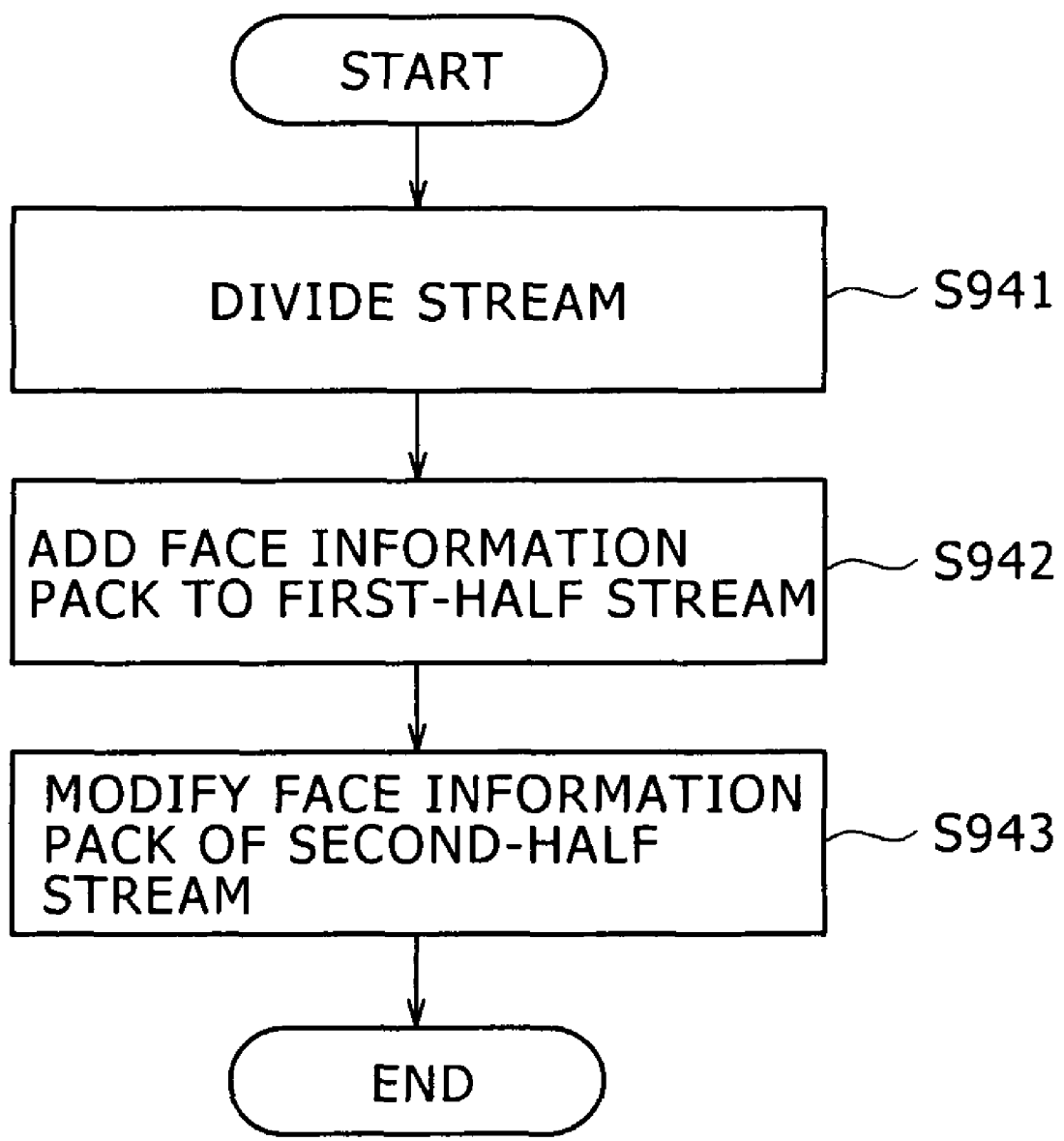
FIG. 20 is a flowchart of steps constituting a typical procedure for updating face information data upon editing of moving picture data according to the embodiment of the invention.

FIG. 20 is a flowchart of steps constituting a typical procedure for updating face information data upon editing of moving picture data according to the embodiment of the invention.

In step S941, based on the data editing instruction input received by the operation reception portion 111, the stream editing portion 142 edits dividedly the stream data recorded in the stream recording portion 191. In step 942, with regard to the stream data preceding a division point, the stream editing portion 142 extracts the face information data preceding the division point from the face information data of the original stream data. The extracted face information data is added as new face information data. In step S943, regarding the stream data subsequent to the division point, the stream editing portion 142 deletes the face information data preceding the division point from the face information data of the original stream data.

According to the embodiment of the invention, as described, the face information pack 769 created by the face information creation portion 115 is placed into the last VOBU or into a VOBU a predetermined number of units earlier than the last unit. This arrangement makes it possible to retain the face information about each of the scenes in the moving picture data even after the transfer of the moving picture data. Given the face information, the face thumbnail creation portion 124 and face index creation portion 125 can create a face index display screen that may be displayed by the display portion 126. The face information may be created not only during imaging but also during data conversion between different formats. Where stream data is to be edited dividedly, the face information pack may be placed into the last VOBU or into a VOBU a predetermined number of units earlier than the last unit in each of the two divided stream data portions.

With the above-described embodiment of the invention in use, the points at which the number of face images changes are considered to be scene delimiters and the representative pictures of moving picture data are created accordingly. However, this is not limitative of the present invention. Alternatively, others points may be established as scene delimiters. Generally, where the information about a plurality of pictures included in moving picture data is constituted by attribute information, the attribute information includes not only the features of the pictures but also audio status relative to the pictures, and the locations and times of day at which the pictures were taken. For example, the information acquired by the clock circuit 39, angular velocity detector 38, and GPS reception block 44 may be collected as attribute information, and points of changes in such attribute information may be regarded as scene delimiters.

With the above-described embodiment of the invention, the face thumbnail creation portion 124 was assumed to create face thumbnails from the I-pictures contained in the VOBU's identified by the addresses created by the address creation portion 123. Alternatively, face thumbnails may be created in advance and placed into the face information data. In this case, the face thumbnail creation portion 124 reads the face thumbnails from the face information data and sends the retrieved face thumbnails to the face index creation portion 125.

While the invention has been described in conjunction with specific embodiments claimed correspondingly in the appended claims as will be outlined below, these embodiments should not be construed as limiting the scope of the invention but as merely providing illustrations of some of the presently preferred embodiments of this invention. It is evident that many alternatives, modifications and variations will become apparent to those skilled in the art in light of the foregoing description.

Other embodiments to be claimed may illustratively include an attribute information detecting step corresponding to step S911, an index data creating step corresponding to step S912, a stream data creating step corresponding to step S914, an attribute information analyzing step corresponding to step S921, a position creating step corresponding to step S922, a representative picture creating step corresponding to steps S923 and S924, and an index display screen creating step corresponding to step S925.

The processing steps discussed above as part of the embodiments of the invention may be considered to be a method formed by these steps arranged in series, a program for causing a computer to carry out the sequence of these steps, or a recording medium on which the program is recorded.

What is claimed is:

1. A picture processing apparatus comprising:
    attribute information detection means for detecting attribute information about a plurality of pictures included in moving picture data;
    index data creation means for creating index data for indexing said attribute information to positions in said moving picture data of those of said plurality of pictures which correspond to said attribute information, wherein the index data delimits said attribute information by detected attribute change points; and
    stream data creation means for creating stream data including said moving picture data and said index data.

2. The picture processing apparatus according to claim 1, wherein said attribute information is constituted by feature quantities of the pictures corresponding to said attribute information.

3. The picture processing apparatus according to claim 2, wherein said attribute information detection means detects the number of face pictures included in said plurality of pictures as said feature quantities.

4. A picture processing apparatus comprising:
    attribute information detection means for detecting attribute information about a plurality of pictures included in moving picture data;
    index data creation means for creating index data for indexing said attribute information to positions in said moving picture data of those of said plurality of pictures which correspond to said attribute information; and
    stream data creation means for creating stream data including said moving picture data and said index data,
    wherein said attribute information is constituted by feature quantities of the pictures of said plurality of pictures corresponding to said attribute information,
    wherein said attribute information detection means detects the number of face pictures included in said plurality of pictures as said feature quantities,
    wherein said stream data creation means creates said stream data in video object units, and
    wherein said index data is stored in the last video object unit.

5. An imaging apparatus comprising:
    imaging means for creating moving picture data by imaging objects;
    attribute information detection means for detecting attribute information about a plurality of pictures included in said moving picture data;
    index data creation means for creating index data for indexing said attribute information to positions in said moving picture data of those of said plurality of pictures which correspond to said attribute information, wherein the index data delimits said attribute information by detected attribute change points; and
    stream data creation means for creating stream data including said moving picture data and said index data.

6. An index creating apparatus for creating an index display screen from stream data which holds both moving picture data and index data for indexing the positions in said moving picture data of a plurality of pictures to attribute information about said plurality of pictures, said index creating apparatus comprising:
    attribute information analysis means for analyzing said attribute information so as to identify the pictures suitable for index display;
    position creation means for creating the positions of the identified pictures in said moving picture data;
    representative picture creation means for creating a representative picture of said moving picture data based on the created positions; and
    index display screen creation means for creating said index display screen based on said representative picture.

7. The index creating apparatus according to claim 6, wherein said attribute information is constituted by feature quantities of the pictures corresponding to said attribute information.

8. An index creating apparatus for creating an index display screen from stream data which holds both moving picture data and index data for indexing the positions in said moving picture data of a plurality of pictures to attribute information about said plurality of pictures, said index creating apparatus comprising:
    attribute information analysis means for analyzing said attribute information so as to identify the pictures suitable for index display;
    position creation means for creating the positions of the identified pictures in said moving picture data;
    representative picture creation means for creating a representative picture of said moving picture data based on the created positions;
    index display screen creation means for creating said index display screen based on said representative picture,
    wherein said attribute information is constituted by feature quantities of the pictures of said plurality of pictures corresponding to said attribute information, and
    wherein said feature quantities denote the number of face pictures included in said plurality of pictures; and
    said attribute information analysis means detects from said plurality of pictures those pictures in which the number of face pictures varies and identifies the detected pictures as said pictures suitable for index display.

9. An imaging apparatus comprising:
    imaging means for creating moving picture data by imaging objects;
    attribute information detection means for detecting attribute information about a plurality of pictures included in said moving picture data;
    index data creation means for creating index data for indexing said attribute information to the positions in said moving picture data of those of said plurality of pictures which correspond to said attribute information;
    stream data creation means for creating stream data including said moving picture data and said index data;

attribute information analysis means for analyzing said attribute information included in said stream data so as to identify the pictures suitable for index display;

position creation means for creating the positions of the identified pictures in said moving picture data;

representative picture creation means for creating a representative picture of said moving picture data based on the created positions; and index display screen creation means for creating an index display screen based on said representative picture.

10. An index creating method, comprising detecting, by a processing unit, attribute information about a plurality of pictures included in moving picture data;

creating index, by the processing unit, data for indexing said attribute information to the positions in said moving picture data of those of said plurality of pictures which correspond to said attribute information;

creating stream data including said moving picture data and said index data;

analyzing said attribute information included in said stream data so as to identify the pictures suitable for index display;

creating the positions of the identified pictures in said moving picture data;

creating a representative picture of said moving picture data based on the created positions; and creating an index display screen based on said representative picture.

11. A computer program product stored on a non-transitory computer readable that when executed by a computer performs a method for processing pictures, the method comprising:

detecting, by a processing unit, attribute information about a plurality of pictures included in moving picture data;

creating, by the processing unit, index data for indexing said attribute information to the positions in said moving picture data of those of said plurality of pictures which correspond to said attribute information;

creating stream data including said moving picture data and said index data;

analyzing said attribute information included in said stream data so as to identify the pictures suitable for index display;

creating the positions of the identified pictures in said moving picture data;

creating a representative picture of said moving picture data based on the created positions; and creating an index display screen based on said representative picture.

12. A picture processing apparatus comprising:

an attribute information detection section of a processor configured to detect attribute information about a plurality of pictures included in moving picture data;

an index data creation section of the processor configured to create index data for indexing said attribute information to the positions in said moving picture data of those of said plurality of pictures which correspond to said attribute information, wherein the index data delimits said attribute information by detected attribute change points; and a stream data creation section configured to create stream data including said moving picture data and said index data.

13. An imaging apparatus comprising:

an imaging section configured to create moving picture data by imaging objects;

an attribute information detection section of a processor configured to detect attribute information about a plurality of pictures included in said moving picture data;

an index data creation section of the processor configured to create index data for indexing said attribute information to positions in said moving picture data of those of said plurality of pictures which correspond to said attribute information, wherein the index data delimits said attribute information by detected attribute change points; and a stream data creation section configured to create stream data including said moving picture data and said index data.

14. An index creating apparatus for creating an index display screen from stream data which holds both moving picture data and index data for indexing the positions in said moving picture data of a plurality of pictures to attribute information about said plurality of pictures, said index creating apparatus comprising:

an attribute information analysis section of a processor configured to analyze said attribute information so as to identify the pictures suitable for index display;

a position creation section of the processor configured to create the positions of the identified pictures in said moving picture data;

a representative picture creation of the processor section configured to create a representative picture of said moving picture data based on the created positions; and an index display screen creation section of the processor configured to create said index display screen based on said representative picture.

15. An imaging apparatus comprising:

an imaging section configured to create moving picture data by imaging objects;

an attribute information detection section of a processor configured to detect attribute information about a plurality of pictures included in said moving picture data;

an index data creation section of the processor configured to create index data for indexing said attribute information to the positions in said moving picture data of those of said plurality of pictures which correspond to said attribute information;

a stream data creation section configured to create stream data including said moving picture data and said index data;

an attribute information analysis section configured to analyze said attribute information included in said stream data so as to identify the pictures suitable for index display;

a position creation section configured to create the positions of the identified pictures in said moving picture data;

a representative picture creation section configured to create a representative picture of said moving picture data based on the created positions; and an index display screen creation section configured to create an index display screen based on said representative picture.

* * * * *